(12) United States Patent
Sensui

(10) Patent No.: US 7,126,759 B2
(45) Date of Patent: Oct. 24, 2006

(54) ZOOM LENS SYSTEM

(75) Inventor: Takayuki Sensui, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/892,169

(22) Filed: Jul. 16, 2004

(65) Prior Publication Data

US 2005/0013015 A1    Jan. 20, 2005

(30) Foreign Application Priority Data

Jul. 17, 2003   (JP) ............................. 2003-198644
Jul. 5, 2004    (JP) ............................ 2004-1983449

(51) Int. Cl.
    *G02B 15/14* (2006.01)
(52) U.S. Cl. ...................... 359/680; 359/684; 359/682
(58) Field of Classification Search ................ 359/680, 359/681, 682, 684, 685, 686
    See application file for complete search history.

(56) References Cited

U.S. PATENT DOCUMENTS 5,329,401 A * 7/1994 Sato ........................... 359/686
5,576,890 A * 11/1996 Tanaka et al. ............... 359/686
5,663,835 A * 9/1997 Shibayama .................. 359/684
5,920,435 A * 7/1999 Shibayama .................. 359/686
6,317,271 B1  11/2001 Sensui ......................... 359/686

FOREIGN PATENT DOCUMENTS

| JP | 6-82698 | 3/1994 |
|----|---------|--------|
| JP | 2000-221399 | 8/2000 |
| JP | 2000-241704 | 9/2000 |
| JP | 2001-83421 | 3/2001 |

* cited by examiner

Primary Examiner—David N. Spector
(74) Attorney, Agent, or Firm—Miles & Stockbridge P.C.

(57) ABSTRACT

A super-wide zoom lens system having sufficient zoom ratio and a high speed, capable of obtaining high optical performance. The system includes at least, in order from an object, a first lens group G1 having negative refractive power, and a second lens group G2 having positive refractive power. When zooming from a wide-angle end state to a telephoto end state, a distance between the first lens group G1 and the second lens group G2 varies. The first lens group G1 includes at least one negative lens element and a glass material constructing at least one negative lens element (SL1) in the first group G1 satisfies given conditions.

26 Claims, 22 Drawing Sheets

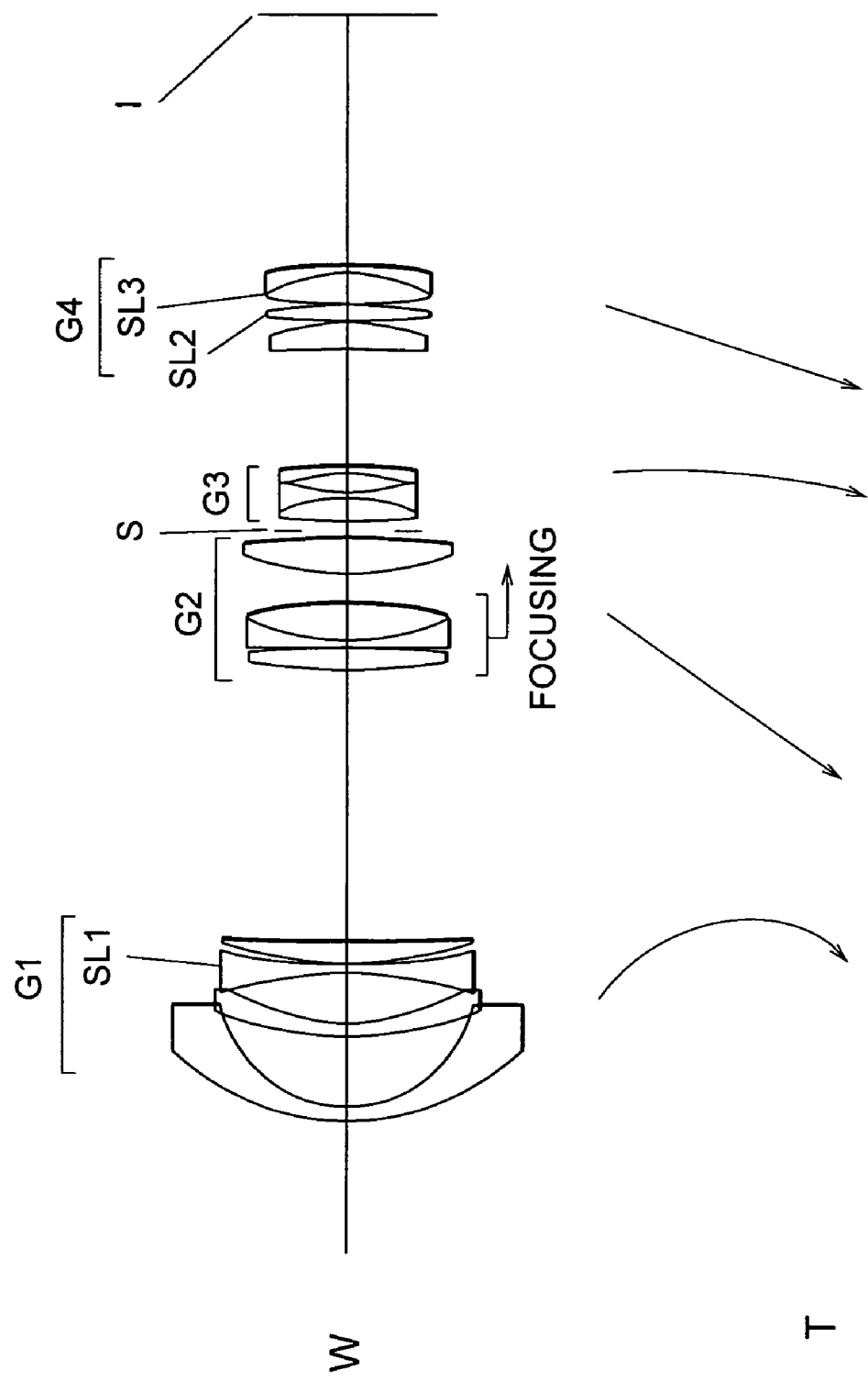

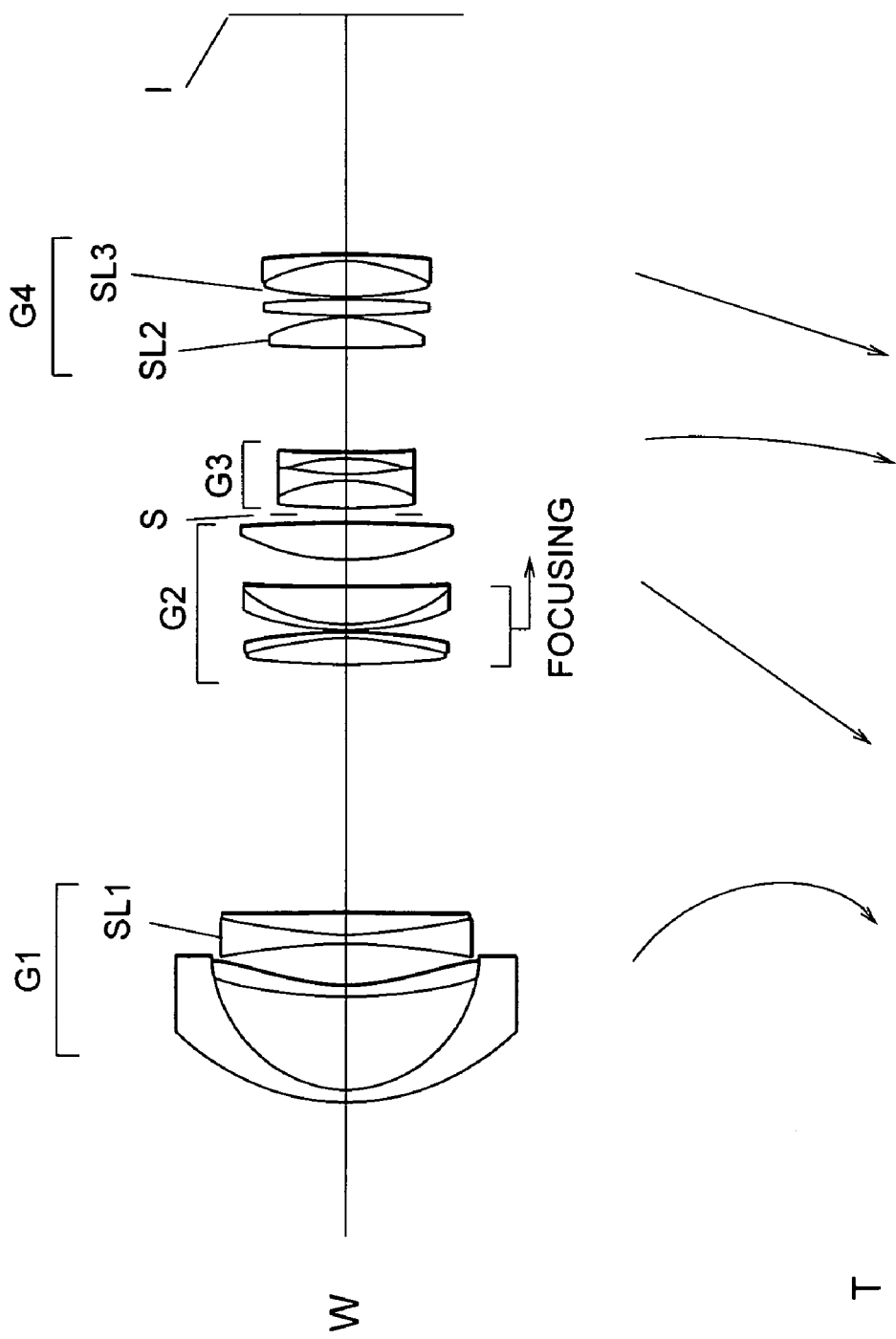

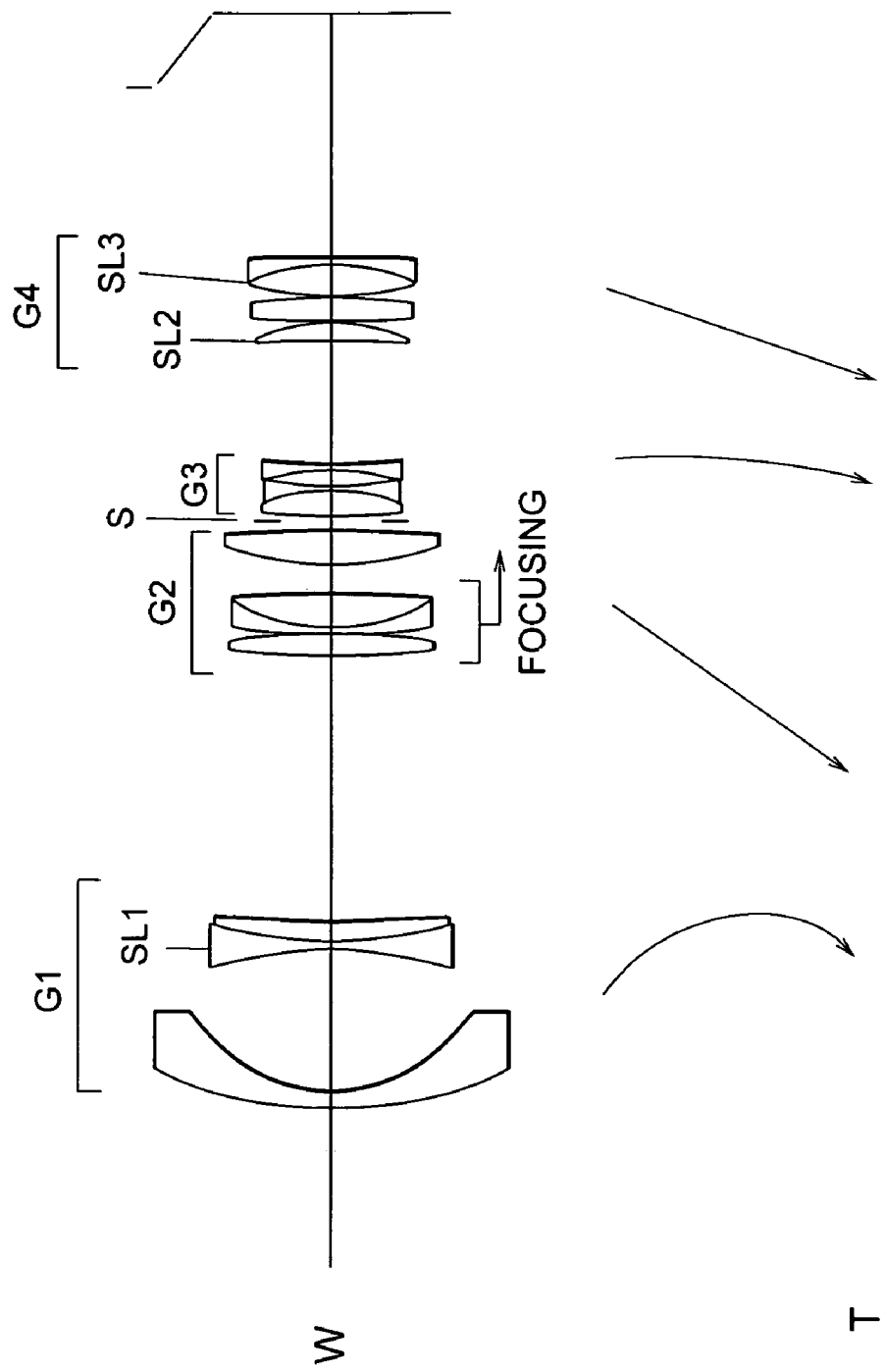

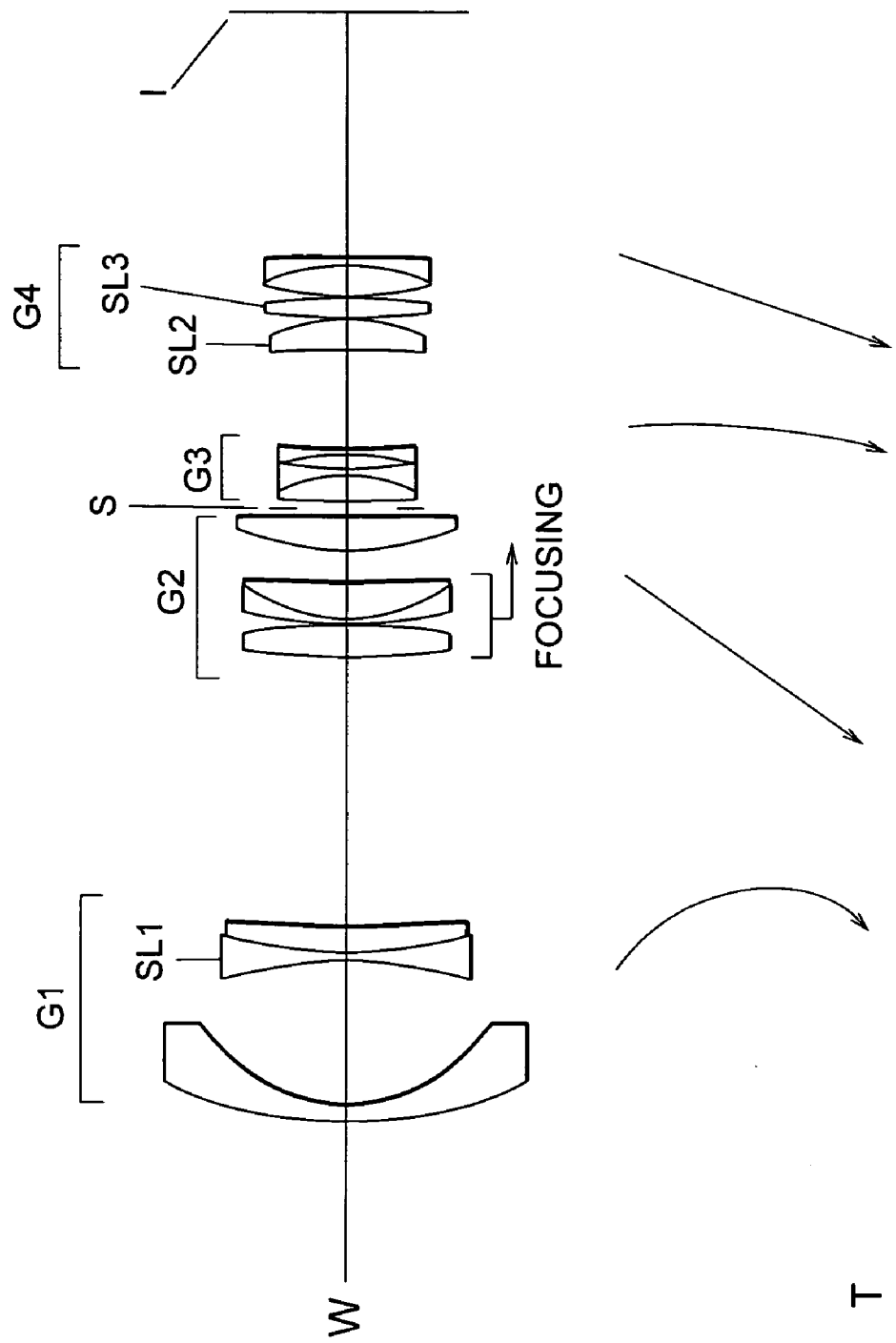

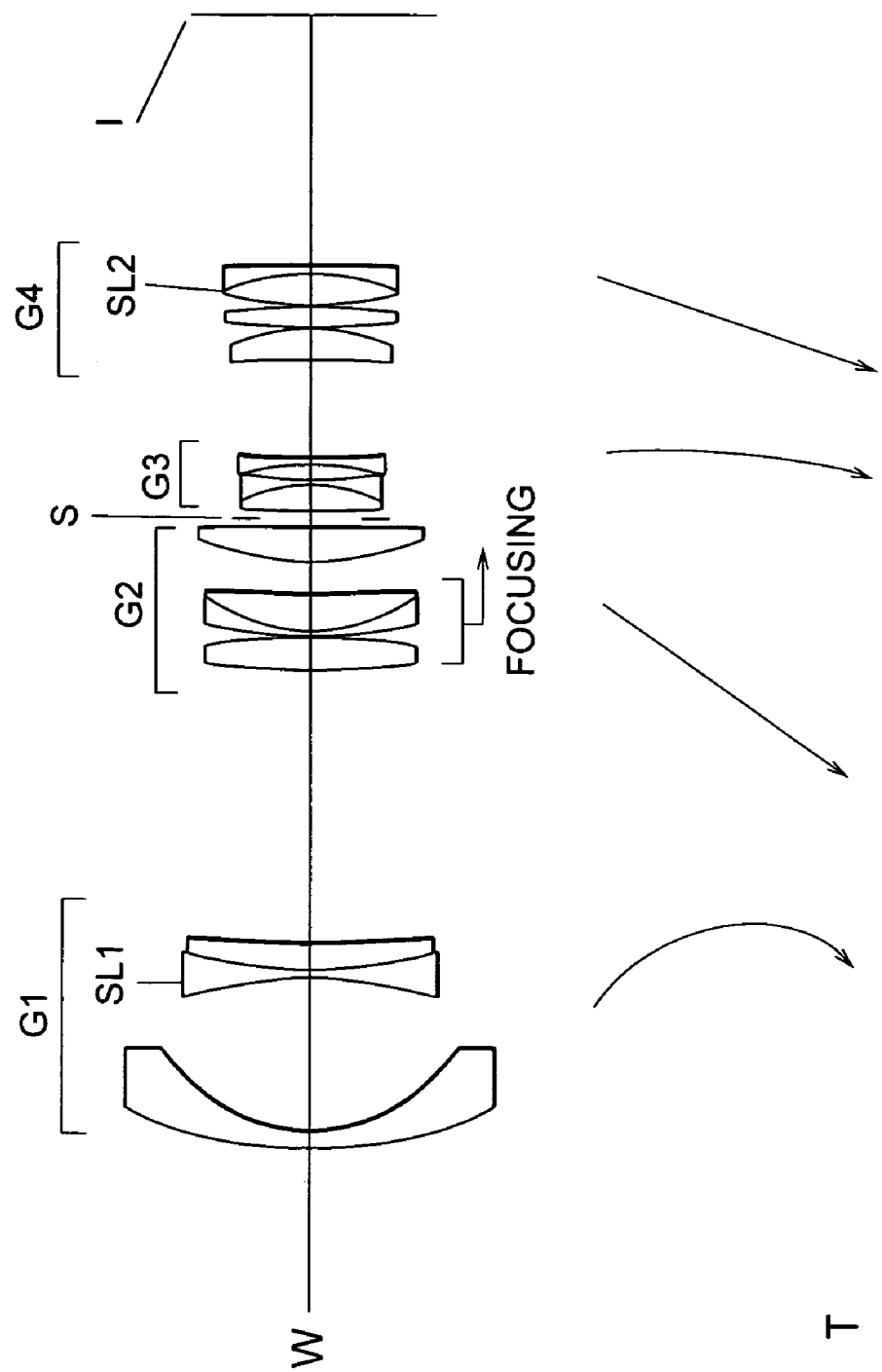

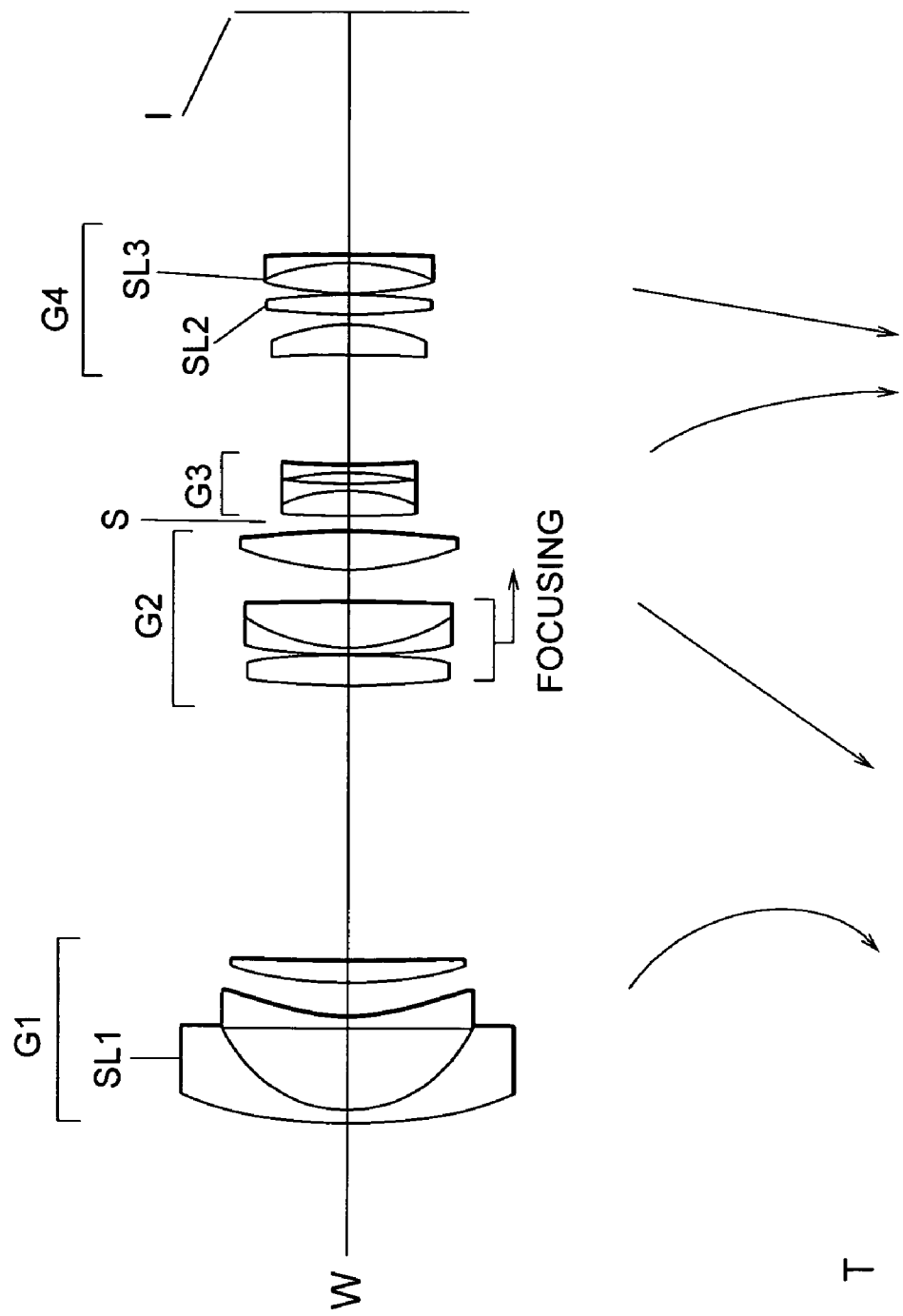

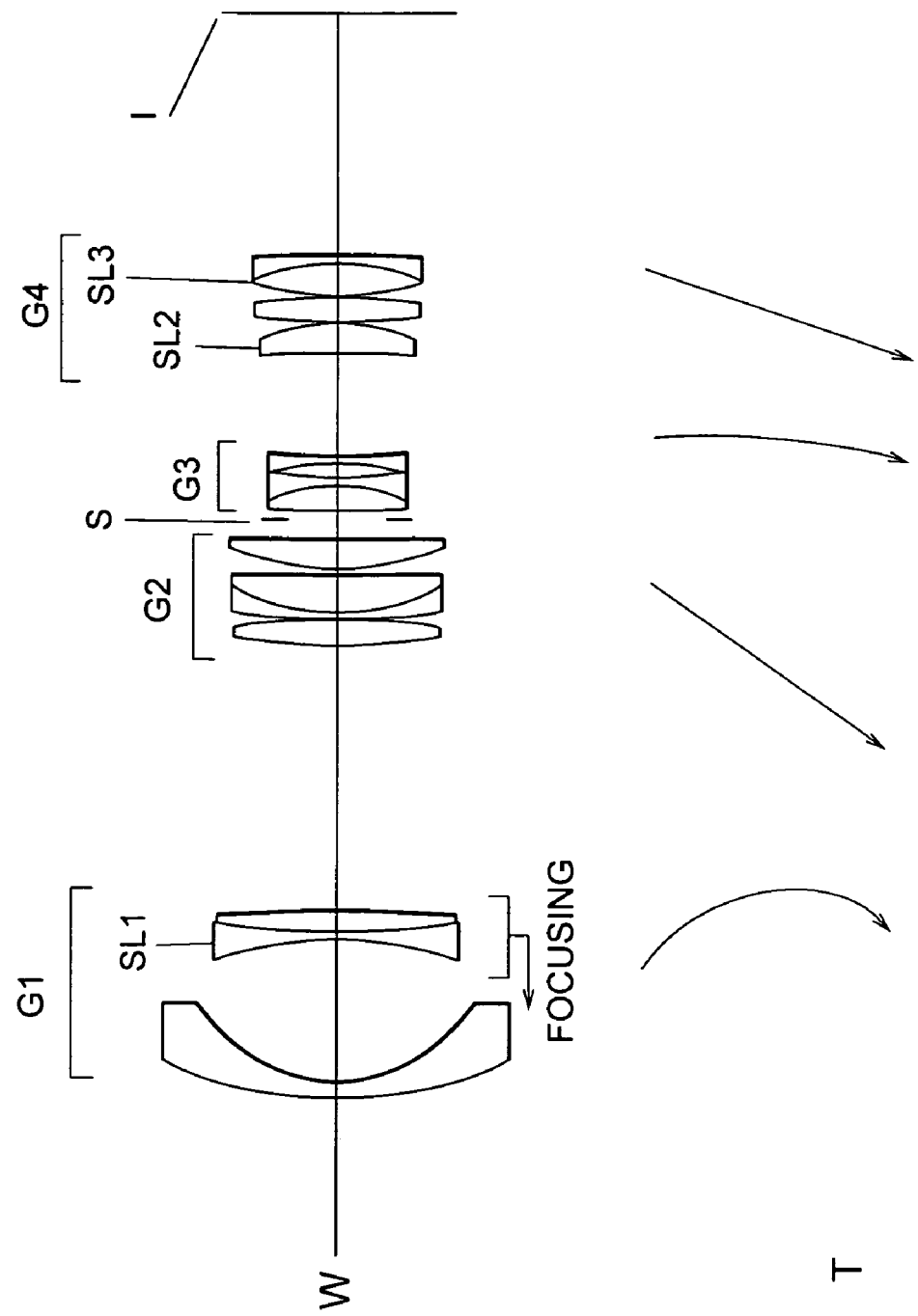

ZOOM LENS SYSTEM

The disclosures of the following priority applications are herein incorporated by reference:
Japanese Patent Application No. 2003-198644 filed on Jul. 17, 2003 and
Japanese Patent Application No. 2004-198349 filed on Jul. 5, 2004.

BACKGROUND OF THE INVENTION

1. Field of the Invention

The present invention relates to a zoom lens system and in particular to a zoom lens system suitable for a single-lens-reflex camera having an angle of view of 75 degrees or more in a wide-angle end state and a zoom ratio of 3 or more.

2. Related Background Art

A zoom lens system having a negative lens group locating at the most object side (a so-called negative-lead type zoom lens) is easy to be made a wide-angle lens and has been made various proposals. On the other hand, the negative-lead type zoom lens has a drawback that it is difficult to satisfy both of a high zoom ratio and a high speed. Accordingly, high-speed zoom lenses overcoming the drawback have been proposed such as Japanese Patent Application Laid-Open Nos. 2000-241704 and 2000-221399.

However, the zoom lenses proposed by the patent documents do not satisfy both of a wide angle of view in the wide-angle end state and a high zoom ratio.

SUMMARY OF THE INVENTION

The present invention is made in view of the aforementioned problems and has an object to provide a super wide zoom lens system having a sufficient zoom ratio with a high speed capable of obtaining high optical performance.

According to one aspect of the present invention, a zoom lens system includes, in order from an object, a first lens group having negative refractive power, and a second lens group having positive refractive power. When the state of lens group positions varies from a wide-angle end state to a telephoto end state, each lens group is moved such that a distance between the first lens group and the second lens group varies. The first lens group includes at least one negative lens element. A glass material constructing at least one of the negative lens element among the at least one negative lens element in the first lens group satisfies all of the following three conditional expressions (1), (2) and (3):

$$67.0 < v \tag{1}$$

$$1.40 < N \tag{2}$$

$$0 < N + 0.0032 \times v - 1.734 \tag{3}$$

where $v$ denotes Abbe number of the glass material at d-line ($\lambda$=587.6 nm), and N denotes refractive index of the glass material at d-line ($\lambda$=587.6 nm).

In one preferred embodiment of the present invention, the zoom lens system further includes, in order from the object, a third lens group having negative refractive power locating to the image side of the second lens group, and a fourth lens group having positive refractive power. When the state of lens group positions varies from a wide-angle end state to a telephoto end state, each lens group is moved such that the distance between the first lens group and the second lens group decreases, a distance between the second lens group and the third lens group increases, and a distance between the third lens group and the fourth lens group decreases. The fourth lens group includes at least one positive lens element, and a glass material constructing at least one positive lens element among the at least one positive lens element in the fourth lens group satisfies all of the following three conditional expressions (1), (2), and (3):

$$67.0 < v \tag{1}$$

$$1.40 < N \tag{2}$$

$$0 < N + 0.0032 \times v - 1.734 \tag{3}$$

where $v$ denotes Abbe number of the glass material at d-line ($\lambda$=587.6 nm), and N denotes refractive index of the glass material at d-line ($\lambda$=587.6 nm).

In one preferred embodiment of the present invention, the following conditional expression (4) is preferably satisfied:

$$1.5 < (-f1)/fw < 2.3 \tag{4}$$

where f1 denotes the focal length of the first lens group in a wide-angle end state, and fw denotes the focal length of the zoom lens system in a wide-angle end state.

In one preferred embodiment of the present invention, the following conditional expression (5) is preferably satisfied:

$$0.75 < f2/(fw \times ft)^{1/2} < 1.6 \tag{5}$$

where f2 denotes the focal length of the second lens group, fw denotes the focal length of the zoom lens system in a wide-angle end state, and ft denotes the focal length of the zoom lens system in a telephoto end state.

In one preferred embodiment of the present invention, the following conditional expressions (6) and (7) are preferably satisfied:

$$0.6 < (-f3)/f2 < 1.2 \tag{6}$$

$$0.8 < f4/(fw \times ft)^{1/2} < 2.0 \tag{7}$$

where f3 denotes the focal length of the third lens group, and f4 denotes the focal length of the fourth lens group.

In one preferred embodiment of the present invention, at least one lens element having negative refractive power with a concave surface facing to an image in the first lens group has an aspherical surface having negative refractive power getting weaker in accordance with increase in a distance to the surface from the optical axis.

In one preferred embodiment of the present invention, the negative lens element in the first lens group satisfying all of the three conditional expressions has a double concave shape.

In one preferred embodiment of the present invention, the first lens group includes the negative lens element that is constructed by a glass material satisfying all of the three conditional expressions and one other lens element, and the negative lens element is cemented with the other lens element.

In one preferred embodiment of the present invention, when the state of lens group positions varies from a wide-angle end state to a telephoto end state, each distance along the optical axis between each lens element composing the first lens group is fixed.

In one preferred embodiment of the present invention, the first lens group is composed of, in order from the object, a first sub-lens group having negative refractive power and a second sub-lens group having negative refractive power, and when the state of lens group positions varies from a wide-angle end state to a telephoto end state, the distance between the first sub-lens group and the second sub-lens group varies.

Other feature and advantages according to the present invention will be readily understood from the detailed description of the preferred embodiments in conjunction with the accompanying drawings.

BRIEF DESCRIPTION OF THE DRAWINGS

FIG. 3 is a diagram showing lens construction of a zoom lens system according to Example 2 of the present invention.

FIG. 7 is a diagram showing lens construction of a zoom lens system according to Example 4 of the present invention.

FIG. 9 is a diagram showing lens construction of a zoom lens system according to Example 5 of the present invention.

FIG. 11 is a diagram showing lens construction of a zoom lens system according to Example 6 of the present invention.

FIG. 13 is a diagram showing lens construction of a zoom lens system according to Example 7 of the present invention.

FIG. 15 is a diagram showing lens construction of a zoom lens system according to Example 8 of the present invention.

FIG. 17 is a diagram showing lens construction of a zoom lens system according to Example 9 of the present invention.

DESCRIPTION OF THE PREFERRED EMBODIMENTS

Figure 1:
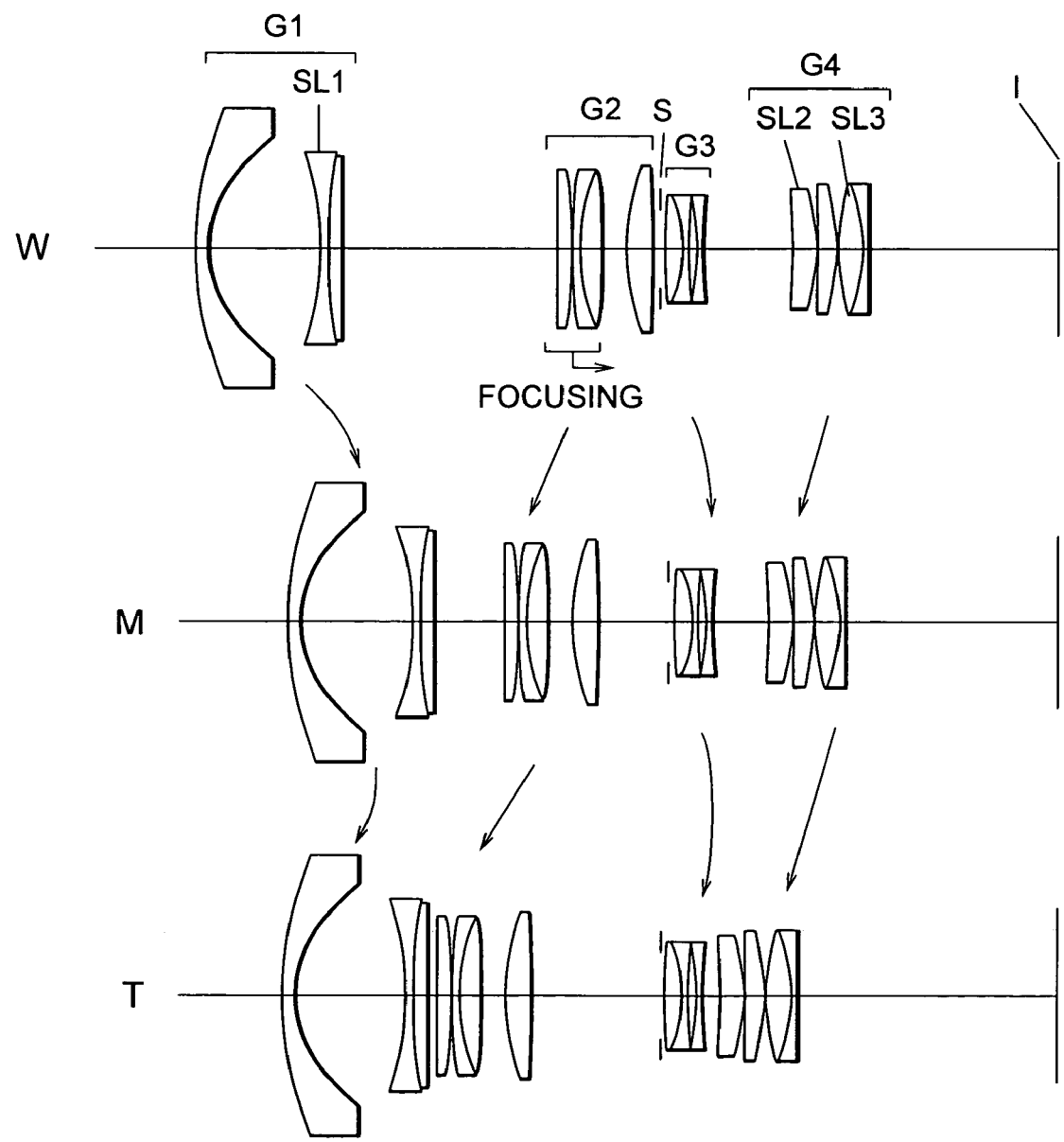
FIG. 1 is a diagram showing lens construction of a zoom lens system according to Example 1 of the present invention in a wide-angle end state (W), an intermediate focal length state (M), and a telephoto end state (T) together with lens group movement upon zooming.

A zoom lens system according to the present invention includes, in order from an object, a first lens group having negative refractive power, a second lens group having positive refractive power, a third lens group having negative refractive power, and a fourth lens group having positive refractive power. When the state of lens group positions varies from a wide-angle end state to a telephoto end state, each lens group is moved such that a distance between the first lens group and the second lens group decreases, a distance between the second lens group and the third lens group increases, and a distance between the third lens group and the fourth lens group decreases.

A glass material constructing at least one of negative lens elements in the first lens group and that constructing at least one of positive lens elements in the fourth lens group satisfy all of the following conditional expressions (1), (2), and (3):

$$67.0 < v \quad (1)$$

$$1.40 < N \quad (2)$$

$$0 < N + 0.0032 \times v - 1.734 \quad (3)$$

where v denotes Abbe number of the glass material at d-line ($\lambda$=587.6 nm), and N denotes refractive index of the glass material at d-line ($\lambda$=587.6 nm).

In a zoom lens system according to the present invention, by constructing at least one of negative lens elements in the first lens group with a glass material satisfying the above-described conditional expressions, since lower ray among the off-axis rays passes through the periphery of the aforementioned negative lens, chromatic coma of the lower ray can be corrected well. The lower ray is a ray lower than the principal ray and an upper ray is a ray higher than the principal ray when the image height is positive.

The above-described conditional expressions (1), (2) and (3) are for appropriately setting refractive index and Abbe number of the glass material constructing at least one of negative lens elements in the first lens group.

When the glass material constructing at least one of negative lens elements in the first lens group does not satisfy any one of the above-described conditional expressions, negative distortion and lateral chromatic aberration in the wide-angle end state become difficult to be corrected with good balance. Moreover, in the wide-angle end state, chromatic coma produces to the lower ray side.

In a zoom lens system according to the present invention, by constructing at least one of positive lens elements in the fourth lens group with a glass material satisfying the above-described conditional expressions, since upper ray among the off-axis rays passes on the periphery of the aforementioned positive lens, chromatic coma of the upper ray can be corrected well.

The above-described conditional expressions (1), (2), and (3) are for appropriately setting refractive index and Abbe number of the glass material constructing at least one of positive lens element in the fourth lens group.

When the glass material constructing at least one of positive lens elements in the fourth lens group does not satisfy any one of the above-described conditional expressions, on-axis chromatic aberration and various aberrations in the telephoto end state become difficult to be corrected with good balance. Moreover, in the wide-angle end state, chromatic coma produces to the upper ray side.

Moreover, the glass material constructing at least one of negative lens elements in the first lens group preferably satisfies all of the following conditional expressions (1a), (2), and (3a):

$$67.0 < \nu < 104.0 \quad (1a)$$

$$1.40 < N \quad (2)$$

$$0 < N + 0.0122 \times \nu - 2.5188 \quad (3a)$$

where $\nu$ denotes Abbe number of the glass material at d-line ($\lambda = 587.6$ nm), and N denotes refractive index of the glass material at d-line ($\lambda = 587.6$ nm).

Moreover, the glass material constructing at least one of positive lens elements in the fourth lens group preferably satisfies all of the following conditional expressions (1a), (2), and (3a):

$$67.0 < \nu < 104.0 \quad (1a)$$

$$1.40 < N \quad (2)$$

$$0 < N + 0.0122 \times \nu - 2.5188 \quad (3a)$$

where $\nu$ denotes Abbe number of the glass material at d-line ($\lambda = 587.6$ nm), and N denotes refractive index of the glass material at d-line ($\lambda = 587.6$ nm).

Furthermore, a zoom lens system according to the present invention preferably satisfies the following conditional expression (4):

$$1.5 < (-f1)/fw < 2.3 \quad (4)$$

where f1 denotes the focal length of the first lens group in a wide-angle end state, and fw denotes the focal length of the zoom lens system in a wide-angle end state.

Furthermore, a zoom lens system according to the present invention preferably satisfies the following conditional expression (5):

$$0.75 < f2/(fw \times ft)^{1/2} < 1.6 \quad (5)$$

where f2 denotes the focal length of the second lens group, fw denotes the focal length of the zoom lens system in a wide-angle end state, and ft denotes the focal length of the zoom lens system in a telephoto end state.

Conditional expression (4) is for setting an appropriate range of the focal length of the first lens group in the wide-angle end state.

When the ratio $(-f1)/fw$ is equal to or exceeds the upper limit of conditional expression (4), the focal length of the first lens group in the wide-angle end state becomes so long that the diameter of the front lens (the diameter of the lens element locating at the most object side) becomes difficult to be miniaturized.

On the other hand, when the ratio is equal to or falls below the lower limit of conditional expression (4), the focal length of the first lens group in the wide-angle end state becomes so short that distortion, coma, and curvature of field in the wide-angle end state become difficult to be corrected. Accordingly, power arrangement of the zoom lens system according to the present invention becomes difficult to be a telephoto type in the telephoto end state, so that it becomes difficult to secure the f-number in the telephoto end state.

Conditional expression (5) is for suitably setting the focal length of the second lens group.

When the ratio $f2/(fw \times ft)^{1/2}$ is equal to or exceeds the upper limit of conditional expression (5), the focal length of the second lens group becomes so long that the moving amount of the second lens group upon zooming becomes excessively long, so that it is undesirable. Moreover, the diameter of the aperture stop in the telephoto end state becomes so large increasing in the diameter of the lens barrel, so that it is undesirable.

On the other hand, when the ratio is equal to or falls below the lower limit of conditional expression (5), the focal length of the second lens group becomes excessively short, so it becomes difficult to correct coma and in particular spherical aberration in the telephoto end state.

In a zoom lens system according to the present invention, the following conditional expressions (6) and (7) are preferably satisfied:

$$0.6 < (-f3)/f2 < 1.2 \quad (6)$$

$$0.8 < f4/(fw \times ft)^{1/2} < 2.0 \quad (7)$$

where f3 denotes the focal length of the third lens group, and f4 denotes the focal length of the fourth lens group.

Conditional expression (6) defines an appropriate range of the ratio of the focal length of the second lens group to that of the third lens group and is for securing the back focal length and high optical performance in a zoom lens system according to the present invention.

When the ratio $(-f3)/f2$ is equal to or exceeds the upper limit of conditional expression (6), the focal length of the third lens group becomes too long relative to that of the second lens group, so that it becomes difficult to secure the back focal length in the wide-angle end state.

On the other hand, when the ratio is equal to or falls below the lower limit of conditional expression (6), the focal length of the third lens group becomes too short relative to that of the second lens group producing large amount of spherical aberration, coma, and distortion in the third lens group, so that it becomes difficult to correct such aberrations with good balance.

Conditional expression (7) is for suitably setting the focal length of the fourth lens group.

When the ratio f4/(fw×ft)$^{1/2}$ is equal to or exceeds the upper limit of conditional expression (7), the focal length of the fourth lens group becomes too long, so that it becomes difficult to secure the back focal length in the wide-angle end state as well as to secure sufficient zoom ratio.

On the other hand, when the ratio is equal to or falls below the lower limit of conditional expression (7), the focal length of the fourth lens group becomes too short producing large amount of variation in various aberrations upon zooming, so that it becomes difficult to correct aberrations over entire zoom range.

In a zoom lens system according to the present invention, it is preferable that at least one lens element having negative refractive power with a concave surface facing to an image in the first lens group has an aspherical surface having negative refractive power getting weaker in accordance with increase in a distance to the surface from the optical axis.

In a zoom lens system according to the present invention, in order to secure sufficient back focal length as well as to prevent the diameter of the front lens from getting larger, although it is effective to make refractive power of the first lens group larger, it also produces large amount of negative distortion. Accordingly, in a zoom lens system according to the present invention, an aspherical surface is arranged to a concave lens surface facing to the image in the first lens group, so the curvature of the lens surface can be smaller than that of the reference sphere. Moreover, the introduction of the aspherical surface produces little amount of spherical aberration and distortion, so that burden of aberration correction to lower lens elements (lens elements locating to the image side of the aspherical surface) can be lightened, so it is desirable.

In a zoom lens system according to the present invention, it is preferable that the negative lens element in the first lens group satisfying all of the three conditional expressions (1), (2), and (3) has a double concave shape. Generally, the glass material is soft in the hardness and tends to be deformed, so that it is preferable that the double concave shape can reduce the deformation.

Moreover, in a zoom lens system according to the present invention, it is preferable that the negative lens element that is constructed by a glass material satisfying all of the three conditional expressions (1), (2), and (3) is cemented with one other lens element. Generally, the glass material is soft in the hardness and tends to be deformed, so that it is preferable that cementing the negative lens with one other lens element can reduce the deformation.

Moreover, in a zoom lens system according to the present invention, it is preferable that when the state of lens group positions varies from a wide-angle end state to a telephoto end state, each distance along the optical axis between each lens element composing the first lens group is fixed. In this construction, it is preferable that the construction can be simplified and variation in aberration upon zooming becomes small.

Furthermore, in a zoom lens system according to the present invention, it is preferable that the first lens group is composed of, in order from the object, a first sub-lens group having negative refractive power and a second sub-lens group having negative refractive power, and when the state of lens group positions varies from a wide-angle end state to a telephoto end state, the distance between the first sub-lens group and the second sub-lens group varies. In this construction, variation in aberration upon zooming is not affected much and is corrected easily, so that it is preferable.

Each example according to the present invention will be explained below with reference to accompanying drawings.

EXAMPLE 1

FIG. 1 is a diagram showing lens construction of a zoom lens system according to Example 1 of the present invention in a wide-angle end state (W), an intermediate focal length state (M), and a telephoto end state (T) together with lens group movement upon zooming.

As shown in FIG. 1, a zoom lens system according to Example 1 includes, in order from an object, a first lens group G1 having negative refractive power, a second lens group G2 having positive refractive power, a third lens group G3 having negative refractive power, and a fourth lens group G4 having positive refractive power. When the state of lens group positions varies from a wide-angle end state to a telephoto end state, each lens group is moved such that a distance between the first lens group G1 and the second lens group G2 decreases, a distance between the second lens group G2 and the third lens group G3 increases, and a distance between the third lens group G3 and the fourth lens group G4 decreases.

An aperture stop S is arranged between the second lens group G2 and the third lens group G3 and is constructed such that the aperture stop S is moved along the optical axis in a body with the third lens group G3 upon zooming.

The above-described feature is common to all Examples explained below, so that the duplicated explanation will be left out in the following Examples.

In a zoom lens system according to Example 1, the second negative lens SL1 from the object side of the first lens group G1 and the first positive lens SL2 and the third positive lens SL3 from the object side of the fourth lens group G4 are made of the glass material (hereinafter called a "special glass" in the specification) satisfying the above-described conditional expressions (1), (2) and (3). The negative lens SL1 made of the special glass has a double concave shape and is cemented with the third lens counted from the object side. When the state of lens group positions varies from a wide-angle end state to a telephoto end state, each distance along the optical axis between each lens element composing the first lens group is fixed. This construction is common to Example 2 through Example 10 explained below, so that the duplicated explanation will be left out in the following Examples.

In a zoom lens system according to Example 1, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 1 are shown below in Table 1. In [Specifications], f denotes the focal length, FNO denotes an f-number, 2A denotes an angle of view, and BF denotes the back focal length.

In [Lens Data], the left most column shows the surface number that is a lens surface counted in order from the object, r denotes the radius of curvature of a lens, and d denotes a distance along the optical axis between the lens surfaces. N denotes refractive index of a medium between the lens surfaces at d-line (λ=587.56 nm) and ν denotes Abbe number of the medium between the lens surfaces at d-line (λ=587.56 nm).

In a zoom lens system according to each Example of the present invention, an aspherical surface is expressed by the following expression;

$$x = cy^2/[1+(1-\kappa c^2 y^2)^{1/2}] + C4 \cdot y^4 + C6 \cdot y^6 + C8 \cdot y^8 + C10 \cdot y^{10} + C12 \cdot y^{12}$$

where y denotes a height from the optical axis, x denotes a sag amount, c denotes a radius of curvature of a reference sphere (a paraxial radius of curvature), κ denotes a conical coefficient, C4, C6, C8, C10 and C12 denote 4th, 6th, 8th, 10th and 12th order aspherical coefficient, respectively.

An aspherical surface is expressed in [Lens Data] by "*" attached to the surface number and the paraxial radius of curvature is listed on the column of radius of curvature "r". In [Aspherical Data], conical coefficient "κ" and each aspherical coefficient are shown. In [Aspherical Data], "E-n" denotes "$10^{-n}$". For example, "1.234E-05" denotes "$1.234 \times 10^{-5}$".

In "Each Lens Block Magnification", β denotes an imaging magnification between object and image. "1-POS" shows when the system is focusing at infinity in a wide-angle end state, "2-POS" shows when the system is focusing at infinity in an intermediate focal length state, "3-POS" shows when the system is focusing at infinity in a telephoto end state, "4-POS" shows when the system is focusing at β=−0.02500 in the wide-angle end state, "5-POS" shows when the system is focusing at β=−0.02500 in the intermediate focal length state, "6-POS" shows when the system is focusing at β=−0.02500 in the telephoto end state, "7-POS" shows when the system is focusing at a close object in the wide-angle end state, "8-POS" shows when the system is focusing at a close object in the intermediate focal length state, "9-POS" shows when the system is focusing at a close object in the telephoto end state. "B(m-n)" denotes a lens block formed by lens elements locating between the "m-th" lens surface and the "n-th" lens surface.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

The explanation of reference symbols is the same in the other examples.

TABLE 1

[Specifications]

| | Wide-angle | Intermediate | Telephoto |
|---|---|---|---|
| f = | 16.5 | 30.67 | 49.5 |
| 2A = | 86.8 | 51.1 | 33.1° |
| FNO = | 2.89 | | |

[Lens Data]

| Surface Number | r | d | N | ν | |
|---|---|---|---|---|---|
| 1) | 76.2729 | 2.5000 | 1.744429 | 49.52 | |
| * 2) | 23.2876 | 22.7082 | | | |
| 3) | −64.3264 | 1.3000 | 1.592400 | 68.33 | SL1 |
| 4) | 94.5578 | 2.9406 | 1.805180 | 25.43 | |
| 5) | 2047.8525 | D5 | | | |
| * 6) | 212.8974 | 3.1597 | 1.677900 | 55.34 | |
| 7) | −110.2891 | 0.1000 | | | |
| 8) | 122.3160 | 1.0000 | 1.846660 | 23.78 | |
| 9) | 34.9545 | 5.0514 | 1.618000 | 63.38 | |
| 10) | −171.3120 | 0.9881 | | | |
| *11) | 50.7936 | 5.3000 | 1.739929 | 49.25 | |
| 12) | −290.3704 | D12 | | | |
| 13> | | 1.2000 | Aperture Stop S | | |
| 14) | 185.3843 | 3.7000 | 1.846660 | 23.78 | |
| 15) | −28.5773 | 1.0000 | 1.804000 | 46.58 | |
| 16) | 110.0860 | 1.9000 | | | |
| 17) | −41.1906 | 1.0000 | 1.804000 | 46.58 | |

TABLE 1-continued

| | | | | | |
|---|---|---|---|---|---|
| 18) | 84.5433 | D18 | | | |
| 19) | −115.2418 | 5.0000 | 1.569070 | 71.31 | SL2 |
| 20) | −34.7029 | 0.1000 | | | |
| 21) | −1329.5201 | 4.0000 | 1.618000 | 63.38 | |
| 22) | −42.2832 | 0.1000 | | | |
| 23) | 48.4541 | 5.3788 | 1.497820 | 82.52 | SL3 |
| 24) | −32.1426 | 1.0000 | 1.846660 | 23.78 | |
| 25) | −732.5906 | | | | |

[Aspherical Data]

Surface Number 2

κ = 0.0000
C4 = 4.05250E−06
C6 = 6.11040E−10
C8 = 8.18800E−12
C10 = −1.46560E−14
C12 = 0.11470E−16

Surface Number 6

κ = 1.0000
C4 = −2.09280E−06
C6 = 1.24370E−09
C8 = 1.65820E−12
C10 = 0.00000E+00

Surface Number 11

κ = 1.0000
C4 = 1.82870E−06
C6 = −7.99320E−10
C8 = 5.20040E−13
C10 = −1.71450E−15

[Variable Intervals]

| | Wide-angle | Intermediate | Telephoto |
|---|---|---|---|
| D5 | 43.77360 | 14.31030 | 2.37600 |
| D12 | 1.35000 | 14.04720 | 25.98790 |
| D18 | 18.19420 | 11.45430 | 3.46290 |

[Each Lens Block Magnification]

| | 1-POS | 2-POS | 3-POS |
|---|---|---|---|
| B(1–5) | 0.00000 | 0.00000 | 0.00000 |
| B(6–10) | −4.23522 | 6.58245 | 3.23525 |
| B(11–12) | 0.13138 | −0.15738 | −0.49191 |
| B(13–18) | −4.41877 | −2.81762 | −1.70363 |
| B(19–25) | −0.21883 | −0.34259 | −0.59534 |

| | 4-POS | 5-POS | 6-POS |
|---|---|---|---|
| β | −0.02500 | −0.02500 | −0.02500 |
| B(1–5) | 0.04712 | 0.02509 | 0.01550 |
| B(6–10) | −4.21836 | 6.59060 | 3.24195 |
| B(11–12) | 0.13131 | −0.15745 | −0.49197 |
| B(13–18) | −4.41638 | −2.81665 | −1.70331 |
| B(19–25) | −0.21893 | −0.34269 | −0.59544 |

| | 7-POS | 8-POS | 9-POS |
|---|---|---|---|
| β | −0.062 | −0.1100 | −0.180 |
| B(1–5) | 0.11999 | 0.11168 | 0.11218 |
| B(6–10) | −4.20477 | 6.58519 | 3.27364 |
| B(11–12) | 0.13094 | −0.15875 | −0.49523 |
| B(13–18) | −4.40373 | −2.79858 | −1.68681 |
| B(19–25) | −0.21949 | −0.34464 | −0.60085 |

Figure 2A:
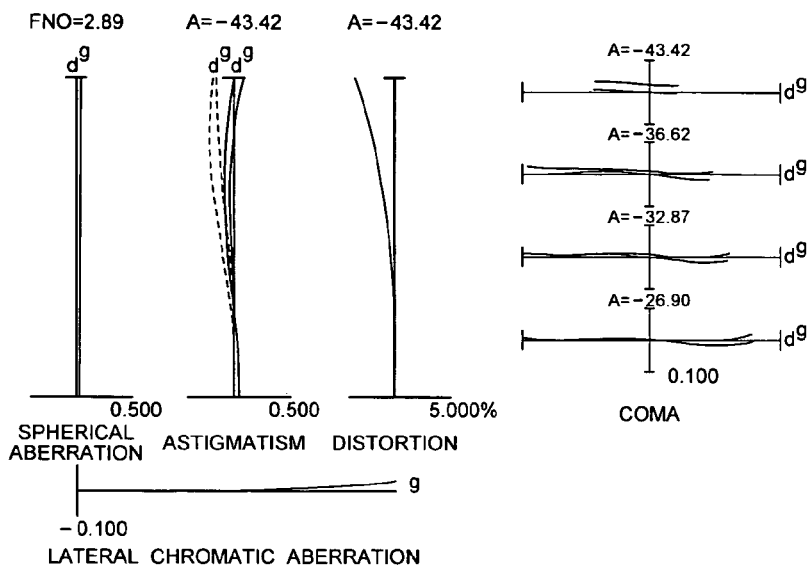
FIGS. 2A, 2B and 2C graphically show various aberrations of the zoom lens system according to Example 1 in a wide-angle end state, an intermediate focal length state, and a telephoto end state, respectively, when the system is focusing at infinity.
Figure 2B:
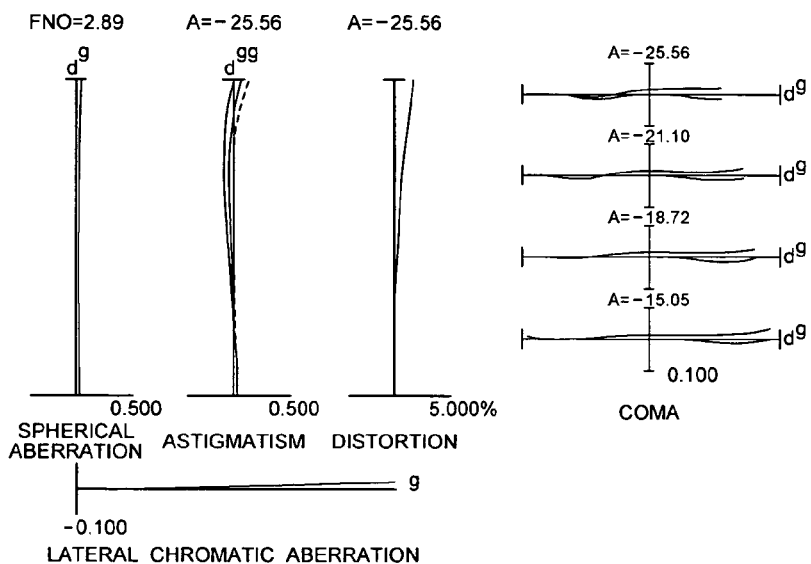
Figure 2C:
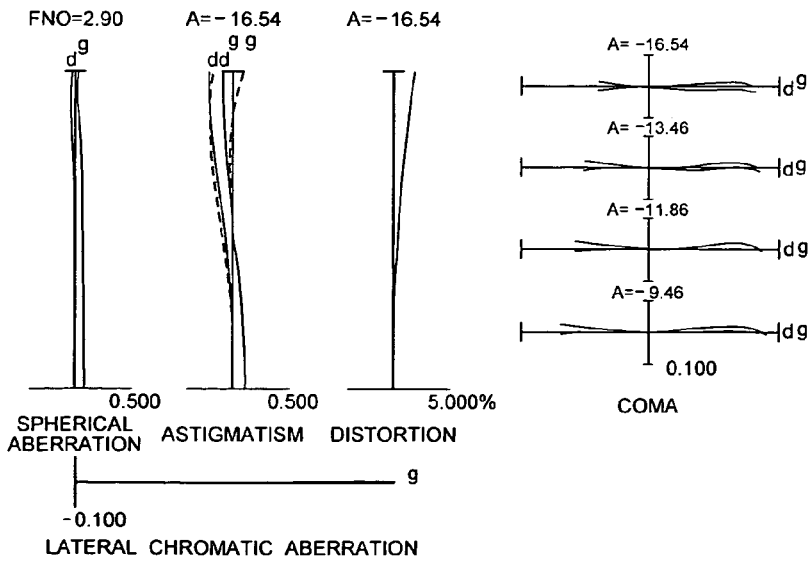

FIGS. 2A, 2B and 2C graphically show various aberrations of the zoom lens system according to Example 1 in a wide-angle end state, an intermediate focal length state, and a telephoto end state, respectively, when the system focusing at infinity.

In respective graphs, FNO denotes the f-number, and A denotes a half angle of view (unit: degree). In the graphs showing astigmatism and distortion, the maximum value of a half angle of view A is shown. Moreover, "d" and "g" denote aberrations at d-line (λ=587.6 nm) and g-line (λ=435.8 nm), respectively.

In the graph showing spherical aberration, FNO shows the value at the maximum aperture. In the graph showing astigmatism, a solid line indicates a sagittal image plane and a broken line indicates a meridional image plane.

In the graph showing coma, a half angle of view A is shown. The above-described explanation regarding various aberration graphs is the same as the other examples.

As is apparent from the respective graphs, the zoom lens system according to Example 1 shows superb optical performance as a result of good corrections to various aberrations in each focal length state (the wide-angle end state, the intermediate focal length state, and the telephoto end state).

EXAMPLE 2

FIG. 3 is a diagram showing lens construction of a zoom lens system according to Example 2 of the present invention. By the way, the figures showing lens construction of the following each Example shows only in the wide-angle end state (W).

In a zoom lens system according to Example 2, the third negative lens SL1 from the object side of the first lens group G1 and the second positive lens SL2 and the third positive lens SL3 from the object side of the fourth lens group G4 are made of the special glass. The negative lens SL1 made of the special glass has a double concave shape.

In a zoom lens system according to Example 2, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 2 are shown below in Table 2.

TABLE 2

[Specifications]

| | Wide-angle | Intermediate | Telephoto |
|---|---|---|---|
| f = | 17.55 | 30.81 | 53.4 |
| 2A = | 83.38 | 51.18 | 30.96° |
| FNO = | 2.89 | | |

[Lens Data]

| Surface Number | r | d | N | ν | |
|---|---|---|---|---|---|
| 1) | 43.0102 | 2.0000 | 1.620410 | 60.29 | |
| 2) | 21.3899 | 11.2854 | | | |
| 3) | 59.7338 | 2.0000 | 1.744429 | 49.55 | |
| * 4) | 32.3245 | 8.1026 | | | |
| 5) | −65.6686 | 1.3000 | 1.569070 | 71.31 | SL1 |
| 6) | 96.9021 | 0.2000 | | | |
| 7) | 69.0297 | 3.3904 | 1.805180 | 25.43 | |
| 8) | 426.3566 | D8 | | | |
| * 9) | 92.4945 | 3.4356 | 1.677900 | 55.34 | |
| 10) | −186.1620 | 0.1000 | | | |
| 11) | −1876.6557 | 1.0000 | 1.805180 | 25.43 | |
| 12) | 38.6412 | 6.0000 | 1.640000 | 59.69 | |
| 13) | −79.2843 | 1.0018 | | | |
| *14) | 49.2354 | 5.9545 | 1.637055 | 58.25 | |
| 15) | −123.3871 | D15 | | | |
| 16> | | 1.2000 | | Aperture Stop S | |
| 17) | 121.9585 | 3.6731 | 1.846660 | 23.78 | |
| 18) | −31.0894 | 1.0000 | 1.804000 | 46.58 | |

TABLE 2-continued

| 19) | 35.1118 | 3.2174 | | | |
|---|---|---|---|---|---|
| 20) | −26.8809 | 1.0000 | 1.804000 | 46.58 | |
| 21) | −65.7049 | D21 | | | |
| 22) | −197.0467 | 4.6157 | 1.618000 | 63.38 | |
| 23) | −32.6618 | 0.1000 | | | |
| 24) | 173.9124 | 2.3568 | 1.497820 | 82.52 | SL2 |
| 25) | −118.9824 | 0.1000 | | | |
| 26) | 89.9876 | 5.0362 | 1.497820 | 82.52 | SL3 |
| 27) | −27.9105 | 1.0000 | 1.846660 | 23.78 | |
| 28) | −77.7117 | | | | |

[Aspherical Data]

Surface Number 4

κ = 0.0000
C4 = −2.80900E−06
C6 = −7.05870E−09
C8 = 1.85210E−11
C10 = −7.69200E−14
C12 = 0.54670E−16

Surface Number 9

κ = 1.0000
C4 = −3.21370E−06
C6 = 3.94540E−09
C8 = −7.52750E−13
C10 = 0.00000E+00

Surface Number 14

κ = 1.0000
C4 = 1.20020E−06
C6 = −2.72780E−09
C8 = 2.23320E−12
C10 = −3.44650E−15

[Variable Intervals]

| | Wide-angle | Intermediate | Telephoto |
|---|---|---|---|
| D8 | 43.73070 | 16.11230 | 1.75000 |
| D15 | 1.35000 | 12.50760 | 25.54550 |
| D21 | 18.86450 | 14.53890 | 5.68120 |

[Each Lens Block Magnification]

| | 1-POS | 2-POS | 3-POS |
|---|---|---|---|
| B(1–8) | 0.00000 | 0.00000 | 0.00000 |
| B(9–13) | −3.50130 | 9.83804 | 3.30002 |
| B(14–15) | 0.15216 | −0.09599 | −0.47835 |
| B(16–21) | −4.93806 | −3.44613 | −1.79102 |
| B(22–28) | −0.21648 | −0.30726 | −0.61284 |

| | 4-POS | 5-POS | 6-POS |
|---|---|---|---|
| β | −0.02500 | −0.02500 | −0.02500 |
| B(1–8) | 0.04455 | 0.02510 | 0.01444 |
| B(9–13) | −3.48253 | 9.84378 | 3.30667 |
| B(14–15) | 0.15210 | −0.09605 | −0.47840 |
| B(16–21) | −4.93546 | −3.44484 | −1.79070 |
| B(22–28) | −0.21658 | −0.30736 | −0.61294 |

| | 7-POS | 8-POS | 9-POS |
|---|---|---|---|
| β | −0.066 | −0.111 | −0.195 |
| B(1–8) | 0.12046 | 0.11279 | 0.11330 |
| B(9–13) | −3.46019 | 9.78411 | 3.34074 |
| B(14–15) | 0.15174 | −0.09720 | −0.48185 |
| B(16–21) | −4.91969 | −3.42048 | −1.77110 |
| B(22–28) | −0.21720 | −0.30930 | −0.61916 |

Figure 4A:
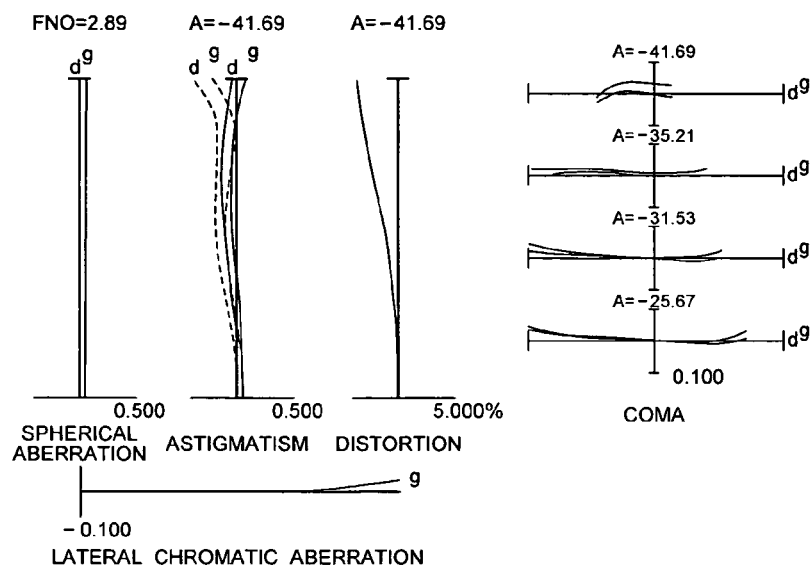
FIGS. 4A, 4B and 4C graphically show various aberrations of the zoom lens system according to Example 2 in a wide-angle end state, an intermediate focal length state, and a telephoto end state, respectively, when the system is focusing at infinity.
Figure 4B:
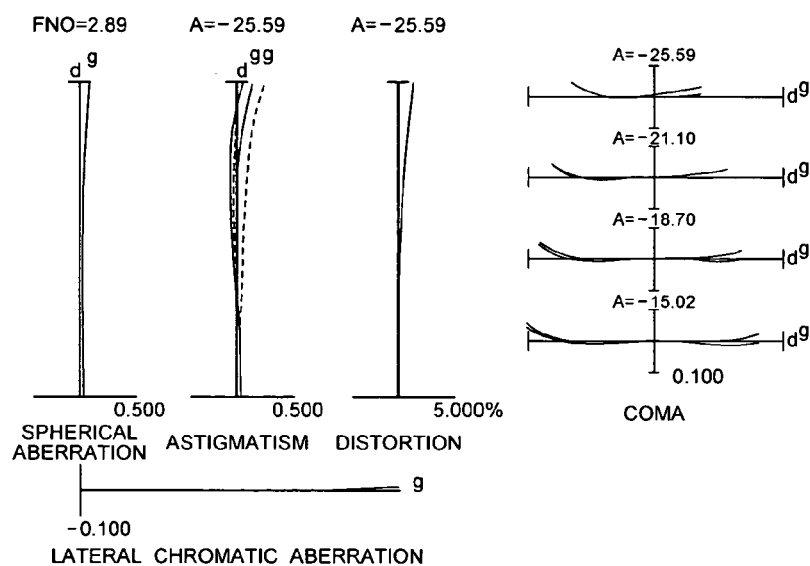
Figure 4C:
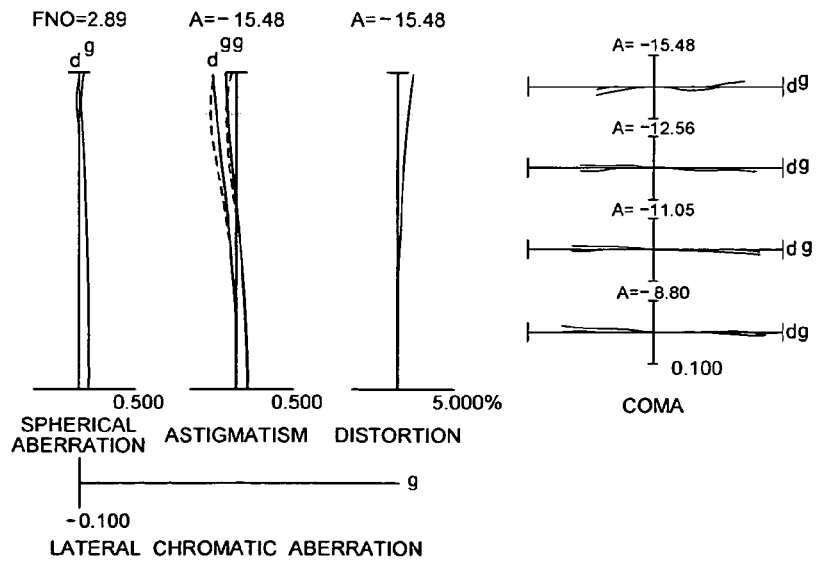

FIGS. 4A, 4B and 4C graphically show various aberrations of the zoom lens system according to Example 2 in a wide-angle end state, an intermediate focal length state, and a telephoto end state, respectively, when the system focusing at infinity.

As is apparent from the respective graphs, the zoom lens system according to Example 2 shows superb optical performance as a result of good corrections to various aberrations in each focal length state (the wide-angle end state, the intermediate focal length state, and the telephoto end state).

EXAMPLE 3

Figure 5:
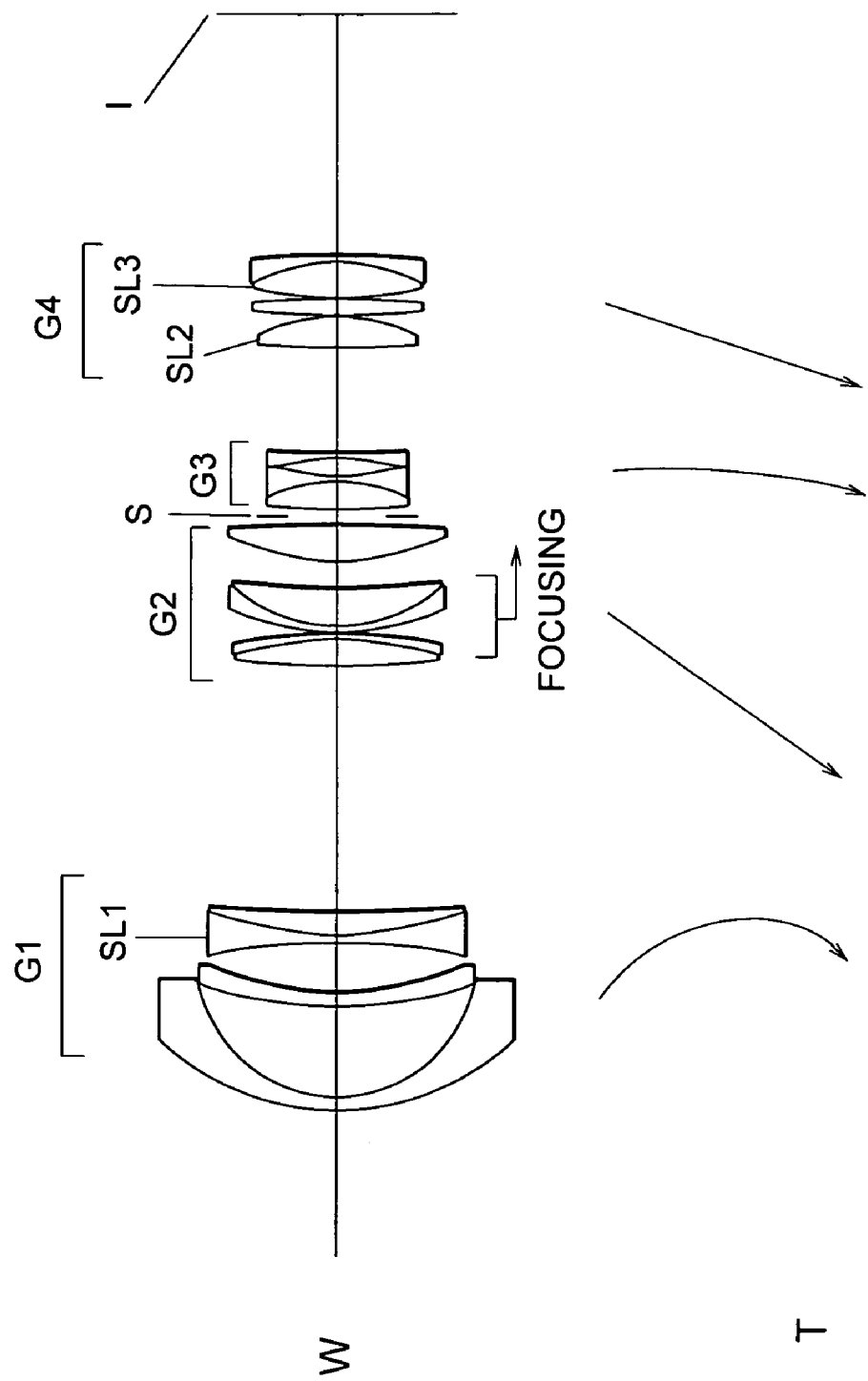
FIG. 5 is a diagram showing lens construction of a zoom lens system according to Example 3 of the present invention.

FIG. 5 is a diagram showing lens construction of a zoom lens system according to Example 3 of the present invention.

In a zoom lens system according to Example 3, the third negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the fourth lens counted from the object side.

In a zoom lens system according to Example 3, focusing from infinity to a close object is carried out by moving a cemented lens constructed by a first lens cemented with a second lens from the object side of the second lens group G2 and a cemented lens constructed by a third lens cemented with a fourth lens from the object side of the second lens group G2 in a body along the optical axis to the image side.

Various values of a zoom lens system according to Example 3 are shown below in Table 3.

TABLE 3

[Specifications]

|  | Wide-angle | Intermediate | Telephoto |
|---|---|---|---|
| f = | 17.55 | 29.61 | 53.4 |
| 2A = | 83.36 | 53.34 | 31.1° |
| FNO = | 2.89 | | |

[Lens Data]

| Surface Number | r | d | N | ν | |
|---|---|---|---|---|---|
| 1) | 41.7490 | 2.0000 | 1.799520 | 42.24 | |
| 2) | 22.5226 | 14.4873 | | | |
| 3) | 74.2071 | 2.0000 | 1.796681 | 45.37 | |
| * 4) | 38.7933 | 8.0658 | | | |
| 5) | −92.4063 | 1.3000 | 1.569070 | 71.31 | SL1 |
| 6) | 58.4359 | 3.7360 | 1.846660 | 23.78 | |
| 7) | 289.3259 | D7 | | | |
| 8) | 180.6275 | 4.2583 | 1.696800 | 55.52 | |
| 9) | −50.6496 | 1.0000 | 1.846660 | 23.78 | |
| 10) | −80.4575 | 0.1000 | | | |
| 11) | 41.9083 | 1.0000 | 1.846660 | 23.78 | |
| 12) | 25.4611 | 6.0000 | 1.487490 | 70.24 | |
| 13) | 157.3587 | 1.0024 | | | |
| *14) | 43.2622 | 5.7575 | 1.713000 | 53.85 | |
| 15) | −259.6633 | D15 | | | |
| 16> | | 1.2000 | Aperture Stop S | | |
| 17) | 128.9726 | 4.3615 | 1.846660 | 23.78 | |
| 18) | −24.3308 | 1.0000 | 1.804000 | 46.58 | |
| 19) | 49.4407 | 2.5995 | | | |
| 20) | −31.3713 | 1.0000 | 1.804000 | 46.58 | |
| 21) | 115.9859 | D21 | | | |
| 22) | 368.8076 | 5.0000 | 1.497820 | 82.52 | SL2 |
| 23) | −28.1873 | 0.1000 | | | |
| 24) | 159.2657 | 2.7000 | 1.618000 | 63.38 | |
| 25) | −123.3241 | 0.1000 | | | |

TABLE 3-continued

| 26) | 65.0663 | 5.7301 | 1.497820 | 82.52 | SL3 |
|---|---|---|---|---|---|
| 27) | −28.1289 | 1.0000 | 1.846660 | 23.78 | |
| 28) | −106.6177 | | | | |

[Aspherical Data]

Surface Number 4

κ = 0.0000
C4 = −3.19380E−06
C6 = −4.94320E−09
C8 = 7.51060E−13
C10 = −1.32410E−14
C12 = −0.44693E−17

Surface Number 14

κ = 1.0000
C4 = 1.00000E−08
C6 = 3.75250E−10
C8 = 1.08920E−12
C10 = 0.00000E+00

[Variable Intervals]

|  | Wide-angle | Intermediate | Telephoto |
|---|---|---|---|
| D7 | 39.33590 | 16.23690 | 1.75000 |
| D15 | 1.35000 | 10.85920 | 22.23130 |
| D21 | 17.07340 | 12.51060 | 5.52610 |

[Each Lens Block Magnification]

|  | 1-POS | 2-POS | 3-POS |
|---|---|---|---|
| B(1–7) | 0.00000 | 0.00000 | 0.00000 |
| B(8–13) | −3.80389 | 12.59026 | 3.40003 |
| B(14–15) | 0.14366 | −0.07072 | −0.43257 |
| B(16–21) | −2.78220 | −2.33000 | −1.35946 |
| B(22–28) | −0.38982 | −0.48203 | −0.90196 |

|  | 4-POS | 5-POS | 6-POS |
|---|---|---|---|
| β | −0.02500 | −0.02500 | −0.02500 |
| B(1–7) | 0.04277 | 0.02511 | 0.01387 |
| B(8–13) | −3.78623 | 12.59237 | 3.40648 |
| B(14–15) | 0.14360 | −0.07077 | −0.43262 |
| B(16–21) | −2.78119 | −2.32934 | −1.35927 |
| B(22–28) | −0.38994 | −0.48215 | −0.90208 |

|  | 7-POS | 8-POS | 9-POS |
|---|---|---|---|
| β | −0.066 | −0.107 | −0.197 |
| B(1–7) | 0.11503 | 0.10862 | 0.10999 |
| B(8–13) | −3.76723 | 12.47409 | 3.43905 |
| B(14–15) | 0.14323 | −0.07178 | −0.43562 |
| B(16–21) | −2.77512 | −2.31783 | −1.34763 |
| B(22–28) | −0.39065 | −0.48422 | −0.90944 |

Figure 6A:
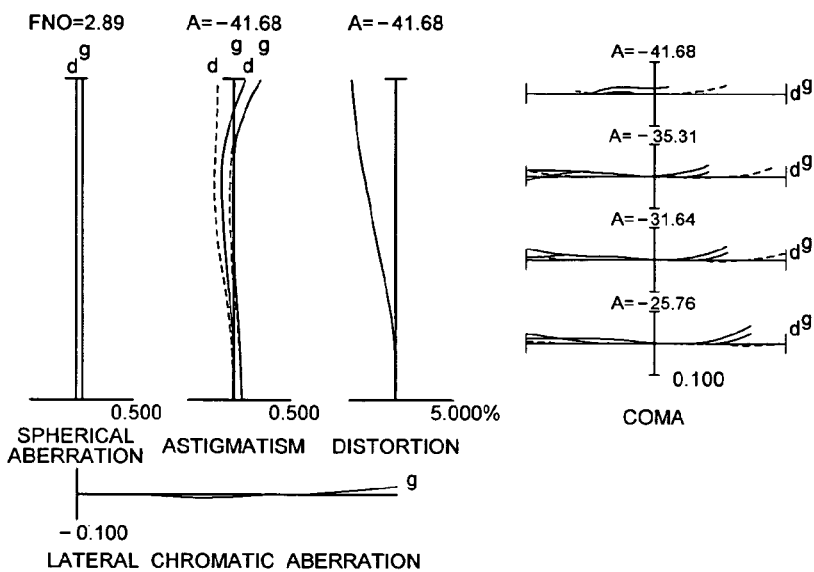
FIGS. 6A, 6B and 6C graphically show various aberrations of the zoom lens system according to Example 3 in a wide-angle end state, an intermediate focal length state, and a telephoto end state, respectively, when the system is focusing at infinity.
Figure 6B:
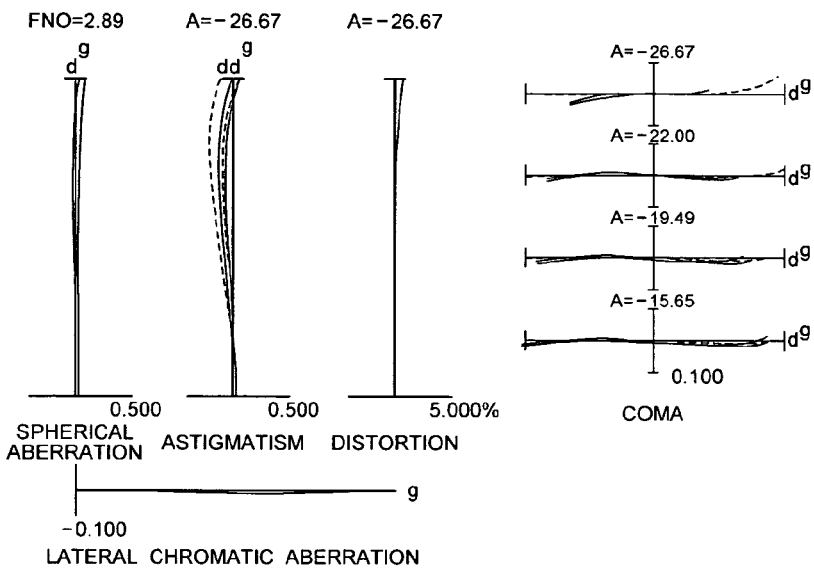
Figure 6C:
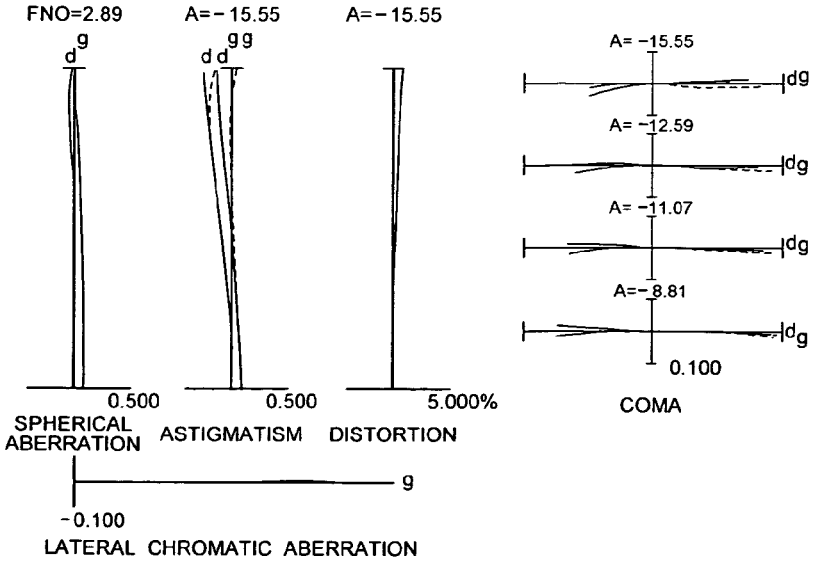

FIGS. 6A, 6B and 6C graphically show various aberrations of the zoom lens system according to Example 3 in a wide-angle end state, an intermediate focal length state, and a telephoto end state, respectively, when the system focusing at infinity.

As is apparent from the respective graphs, the zoom lens system according to Example 3 shows superb optical performance as a result of good corrections to various aberrations in each focal length state (the wide-angle end state, the intermediate focal length state, and the telephoto end state).

EXAMPLE 4

FIG. 7 is a diagram showing lens construction of a zoom lens system according to Example 4 of the present invention.

In a zoom lens system according to Example 4, the third negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the fourth lens counted from the object side.

In a zoom lens system according to Example 4, focusing from infinity to a close object is carried out by moving a cemented lens constructed by a first lens cemented with a second lens from the object side of the second lens group G2 and a cemented lens constructed by a third lens cemented with a fourth lens from the object side of the second lens group G2 in a body along the optical axis to the image side.

Various values of a zoom lens system according to Example 4 are shown below in Table 4.

TABLE 4

[Specifications]

|  | Wide-angle | Intermediate | Telephoto |
|---|---|---|---|
| f = | 17.55 | 30.79 | 53.4 |
| 2A = | 83.34 | 51.24 | 30.98° |
| FNO = | 2.89 | | |

[Lens Data]

| Surface Number | r | d | N | ν |
|---|---|---|---|---|
| 1) | 40.9179 | 2.0000 | 1.806100 | 40.94 |
| 2) | 21.9529 | 14.9387 | | |
| 3) | 85.5860 | 2.0000 | 1.796681 | 45.37 |
| *4) | 41.8649 | 6.6331 | | |
| 5) | −88.8627 | 1.3000 | 1.569070 | 71.31 SL1 |
| 6) | 79.4414 | 3.4131 | 1.846660 | 23.78 |
| 7) | 4482.0238 | D7 | | |
| 8) | 265.6240 | 4.1124 | 1.696800 | 55.52 |
| 9) | −53.0226 | 1.0000 | 1.805180 | 25.43 |
| 10) | −85.4782 | 0.1000 | | |
| 11) | 48.4579 | 1.0000 | 1.846660 | 23.78 |
| 12) | 28.3332 | 6.0000 | 1.487490 | 70.24 |
| 13) | 609.7882 | 1.0047 | | |
| 14) | 44.0030 | 5.8155 | 1.696800 | 55.52 |
| 15) | −207.9680 | D15 | | |
| 16> | | 1.2000 | Aperture Stop S | |
| 17) | 132.9964 | 4.2981 | 1.846660 | 23.78 |
| 18) | −24.6683 | 1.0000 | 1.804000 | 46.58 |
| 19) | 52.5868 | 2.6051 | | |
| 20) | −31.0252 | 1.0000 | 1.804000 | 46.58 |
| 21) | 108.4429 | D21 | | |
| 22) | 1202.2229 | 5.0000 | 1.497820 | 82.52 SL2 |
| 23) | −26.9875 | 0.1000 | | |
| 24) | 152.4677 | 2.7000 | 1.618000 | 63.38 |
| 25) | −129.6517 | 0.1000 | | |
| 26) | 54.2036 | 6.0000 | 1.497820 | 82.52 SL3 |
| 27) | −30.0273 | 1.0000 | 1.846660 | 23.78 |
| 28) | −162.9006 | | | |

[Aspherical Data]

Surface Number 4
κ = 0.0000
C4 = −4.05780E−06
C6 = −3.17270E−09
C8 = −1.99470E−11
C10 = 5.77110E−14
C12 = −0.94474E−16

[Variable Intervals]

|  | Wide-angle | Intermediate | Telephoto |
|---|---|---|---|
| D7 | 40.95880 | 15.53650 | 1.75000 |
| D15 | 1.35000 | 12.25530 | 23.90170 |
| D21 | 17.41550 | 13.09280 | 6.05810 |

TABLE 4-continued

[Each Lens Block Magnification]

|  | 1-POS | 2-POS | 3-POS |
|---|---|---|---|
| B(1–7) | 0.00000 | 0.00000 | 0.00000 |
| B(8–13) | −3.82942 | 10.11327 | 3.40001 |
| B(14–15) | 0.13758 | −0.08740 | −0.41103 |
| B(16–21) | −2.61985 | −2.38465 | −1.57100 |
| B(22–28) | −0.41289 | −0.47443 | −0.78981 |

|  | 4-POS | 5-POS | 6-POS |
|---|---|---|---|
| β | −0.02500 | −0.02500 | −0.02500 |
| B(1–7) | 0.04449 | 0.02510 | 0.01443 |
| B(8–13) | −3.81121 | 10.11878 | 3.40667 |
| B(14–15) | 0.13752 | −0.08746 | −0.41108 |
| B(16–21) | −2.61895 | −2.38397 | −1.57075 |
| B(22–28) | −0.41301 | −0.47455 | −0.78993 |

|  | 7-POS | 8-POS | 9-POS |
|---|---|---|---|
| β | −0.066 | −0.111 | −0.195 |
| B(1–7) | 0.12027 | 0.11285 | 0.11327 |
| B(8–13) | −3.79169 | 10.05288 | 3.44006 |
| B(14–15) | 0.13714 | −0.08853 | −0.41394 |
| B(16–21) | −2.61348 | −2.37106 | −1.55587 |
| B(22–28) | −0.41373 | −0.47678 | −0.79712 |

Figure 8A:
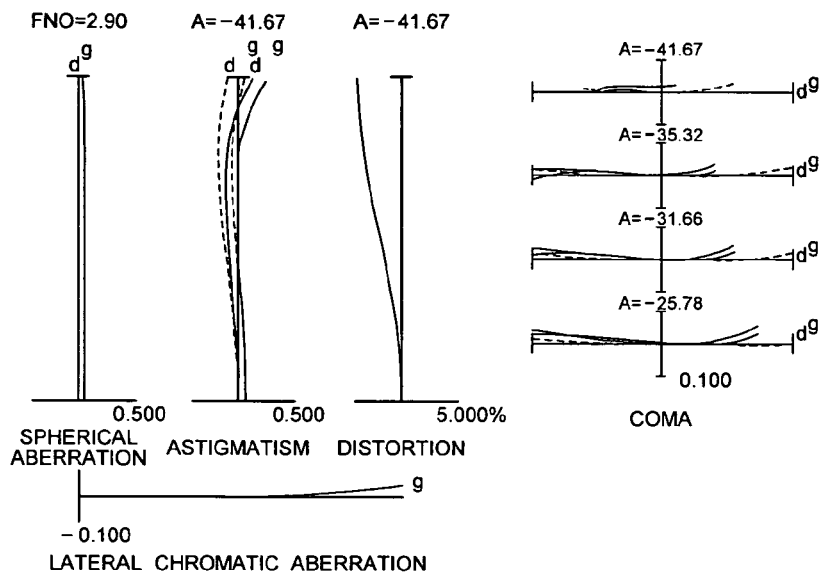
FIGS. 8A, 8B and 8C graphically show various aberrations of the zoom lens system according to Example 4 in a wide-angle end state, an intermediate focal length state, and a telephoto end state, respectively, when the system is focusing at infinity.
Figure 8B:
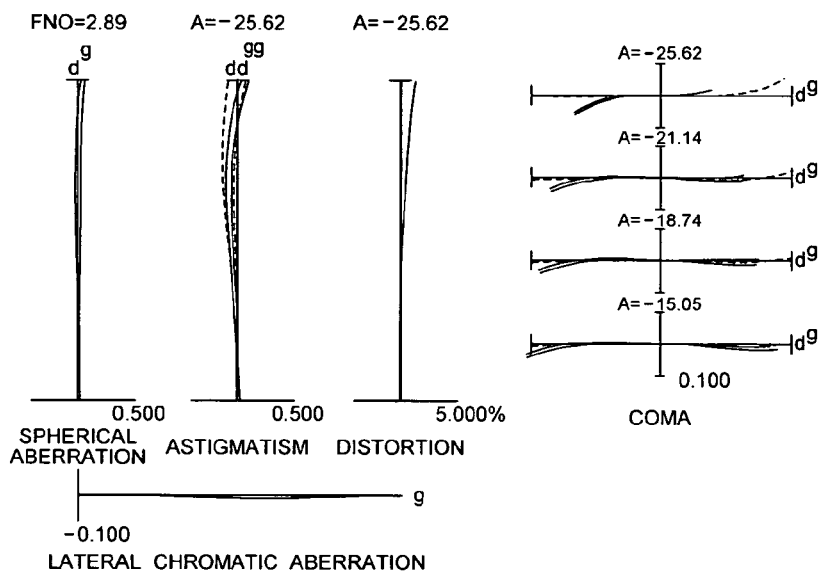
Figure 8C:
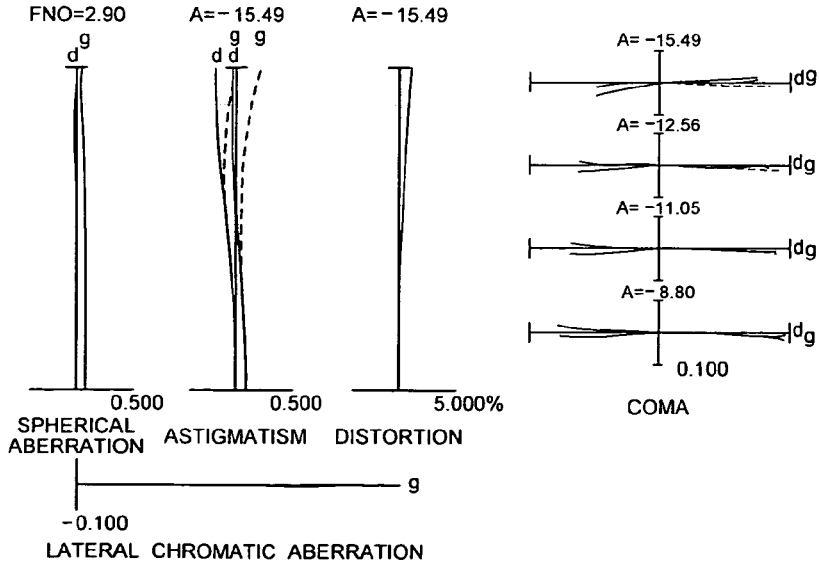

FIGS. 8A, 8B and 8C graphically show various aberrations of the zoom lens system according to Example 4 in a wide-angle end state, an intermediate focal length state, and a telephoto end state, respectively, when the system focusing at infinity.

As is apparent from the respective graphs, the zoom lens system according to Example 4 shows superb optical performance as a result of good corrections to various aberrations in each focal length state (the wide-angle end state, the intermediate focal length state, and the telephoto end state).

EXAMPLE 5

FIG. 9 is a diagram showing lens construction of a zoom lens system according to Example 5 of the present invention.

In a zoom lens system according to Example 5, the second negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the third lens counted from the object side.

In a zoom lens system according to Example 5, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 5 are shown below in Table 5.

TABLE 5

[Specifications]

|  | Wide-angle | Intermediate | Telephoto |
|---|---|---|---|
| f = | 17.55 | 31.43 | 52.7 |
| 2A = | 83.30 | 50.04 | 31.16° |
| FNO = | 2.89 | | |

TABLE 5-continued

[Lens Data]

| Surface Number | r | d | N | ν | |
|---|---|---|---|---|---|
| 1) | 68.8329 | 2.5000 | 1.744429 | 49.55 | |
| *2) | 23.7109 | 22.4287 | | | |
| 3) | −58.4517 | 1.3000 | 1.518601 | 69.98 | SL1 |
| 4) | 70.0469 | 2.9936 | 1.805180 | 25.43 | |
| 5) | 243.9094 | D5 | | | |
| *6) | 140.0441 | 3.4072 | 1.677900 | 55.34 | |
| 7) | −118.9794 | 0.1000 | | | |
| 8) | 124.6930 | 1.0000 | 1.846660 | 23.78 | |
| 9) | 34.2030 | 5.1696 | 1.618000 | 63.38 | |
| 10) | −189.4107 | 4.8624 | | | |
| *11) | 53.9597 | 5.3000 | 1.739929 | 49.25 | |
| 12) | −211.8800 | D12 | | | |
| 13> | | 1.2000 | Aperture Stop S | | |
| 14) | 172.5088 | 4.0000 | 1.846660 | 23.78 | |
| 15) | −28.2347 | 1.0000 | 1.804000 | 46.58 | |
| 16) | 89.6343 | 1.9000 | | | |
| 17) | −39.5906 | 1.0000 | 1.804000 | 46.58 | |
| 18) | 99.5109 | D18 | | | |
| 19) | −134.6632 | 2.9801 | 1.497820 | 82.52 | SL2 |
| 20) | −28.2015 | 0.1000 | | | |
| 21) | 217.9857 | 4.0048 | 1.618000 | 63.38 | |
| 22) | −73.2014 | 0.1000 | | | |
| 23) | 52.8039 | 5.0164 | 1.497820 | 82.52 | SL3 |
| 24) | −32.8433 | 1.0000 | 1.846660 | 23.78 | |
| 25) | −316.9872 | | | | |

[Aspherical Data]

Surface Number 2

κ = 0.0000
C4 = 4.40610E−06
C6 = −5.89290E−11
C8 = 1.12530E−11
C10 = −1.85420E−14
C12 = 0.13297E−16

Surface Number 6

κ = 1.0000
C4 = −1.92900E−06
C6 = 2.71180E−10
C8 = 2.50890E−12
C10 = 0.00000E+00

Surface Number 11

κ = 1.0000
C4 = 1.56610E−06
C6 = −1.53820E−10
C8 = −4.17120E−13
C10 = −6.25410E−16

[Variable Intervals]

| | Wide-angle | Intermediate | Telephoto |
|---|---|---|---|
| D5 | 42.31750 | 14.64730 | 1.75000 |
| D12 | 1.35000 | 13.25580 | 26.88160 |
| D18 | 19.82980 | 14.04550 | 5.77250 |

[Each Lens Block Magnification]

| | 1-POS | 2-POS | 3-POS |
|---|---|---|---|
| B(1–5) | 0.00000 | 0.00000 | 0.00000 |
| B(6–10) | −3.85705 | 8.28143 | 3.35704 |
| B(11–12) | 0.14552 | −0.12187 | −0.47878 |
| B(13–18) | −4.46382 | −2.94501 | −1.77544 |
| B(19–25) | −0.22289 | −0.33643 | −0.58761 |

| | 4-POS | 5-POS | 6-POS |
|---|---|---|---|
| β | −0.02500 | −0.02500 | −0.02500 |
| B(1–5) | 0.04541 | 0.02509 | 0.01492 |
| B(6–10) | −3.83872 | 8.28878 | 3.36388 |
| B(11–12) | 0.14545 | −0.12194 | −0.47884 |
| B(13–18) | −4.46147 | −2.94398 | −1.77511 |
| B(19–25) | −0.22299 | −0.33654 | −0.58772 |

| | 7-POS | 8-POS | 9-POS |
|---|---|---|---|
| β | −0.065 | −0.112 | −0.191 |
| B(1–5) | 0.12144 | 0.11379 | 0.11446 |
| B(6–10) | −3.81947 | 8.25780 | 3.39767 |
| B(11–12) | 0.14506 | −0.12322 | −0.48232 |
| B(13–18) | −4.44756 | −2.92411 | −1.75562 |
| B(19–25) | −0.22361 | −0.33856 | −0.59379 |

Figure 10A:
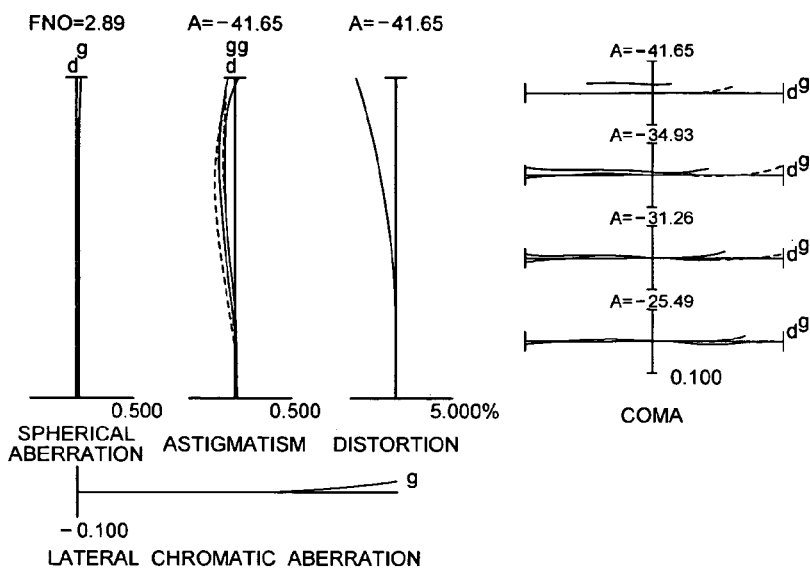
FIGS. 10A, 10B and 10C graphically show various aberrations of the zoom lens system according to Example 5 in a wide-angle end state, an intermediate focal length state, and a telephoto end state, respectively, when the system is focusing at infinity.
Figure 10B:
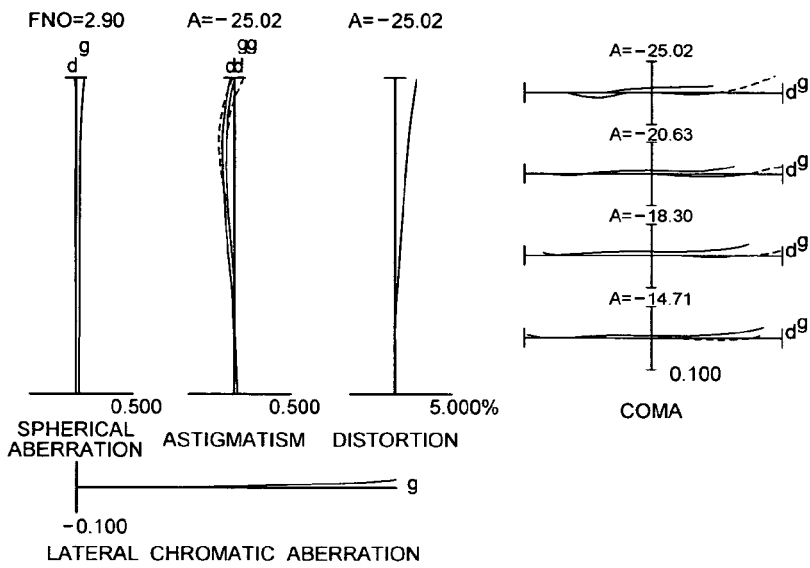
Figure 10C:
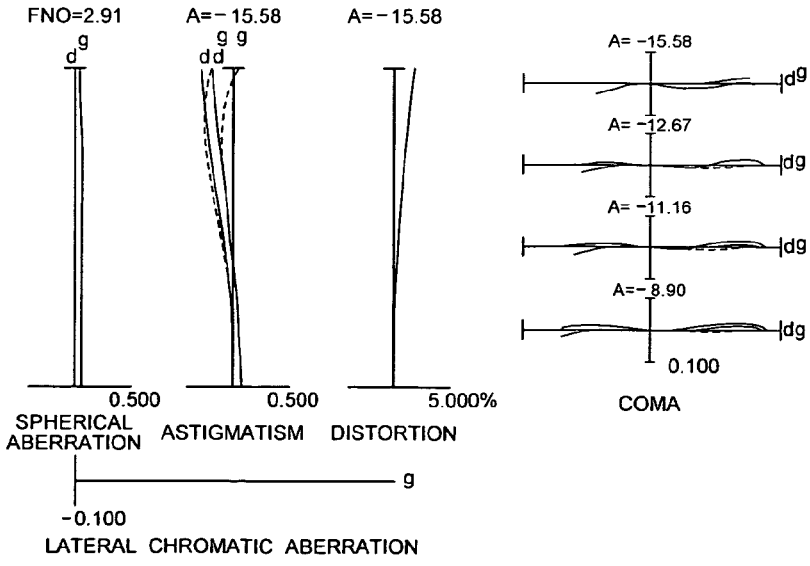

FIGS. 10A, 10B and 10C graphically show various aberrations of the zoom lens system according to Example 5 in a wide-angle end state, an intermediate focal length state, and a telephoto end state, respectively, when the system focusing at infinity.

As is apparent from the respective graphs, the zoom lens system according to Example 5 shows superb optical performance as a result of good corrections to various aberrations in each focal length state (the wide-angle end state, the intermediate focal length state, and the telephoto end state).

EXAMPLE 6

FIG. 11 is a diagram showing lens construction of a zoom lens system according to Example 6 of the present invention.

In a zoom lens system according to Example 6, the second negative lens SL1 from the object side of the first lens group G1 and the first positive lens SL2 and the second positive lens SL3 from the object side of the fourth lens group G4 are made of the special glass. The negative lens SL1 made of the special glass has a double concave shape and is cemented with the third lens counted from the object side.

In a zoom lens system according to Example 6, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 6 are shown below in Table 6.

TABLE 6

[Specifications]

| | Wide-angle | Intermediate | Telephoto |
|---|---|---|---|
| f = | 17.55 | 33.28 | 52.70 |
| 2A = | 83.28 | 47.68 | 31.22° |
| FNO = | 2.89 | | |

[Lens Data]

| Surface Number | r | d | N | ν | |
|---|---|---|---|---|---|
| 1) | 77.9118 | 2.5000 | 1.744429 | 49.55 | |
| *2) | 23.9592 | 22.1602 | | | |
| 3) | −70.9994 | 1.3000 | 1.497820 | 82.52 | SL1 |
| 4) | 70.5855 | 4.0000 | 1.805180 | 25.43 | |
| 5) | 237.2767 | D5 | | | |
| *6) | 120.3497 | 5.0000 | 1.677900 | 55.34 | |
| 7) | −95.2433 | 0.1000 | | | |
| 8) | 75.8194 | 1.0000 | 1.846660 | 23.78 | |
| 9) | 28.7700 | 5.3700 | 1.618000 | 63.38 | |
| 10) | 219.8396 | 5.3096 | | | |
| *11) | 49.5255 | 5.2968 | 1.744429 | 49.55 | |

TABLE 6-continued

| | | | | |
|---|---|---|---|---|
| 12) | −452.9605 | D12 | | |
| 13> | | 1.2000 | Aperture Stop S | |
| 14) | 271.7867 | 3.9927 | 1.846660 | 23.78 |
| 15) | −24.9597 | 1.0000 | 1.804000 | 46.58 |
| 16) | 121.7054 | 1.9000 | | |
| 17) | −34.9526 | 1.0000 | 1.804000 | 46.58 |
| 18) | 90.3510 | D18 | | |
| 19) | −334.0058 | 5.0000 | 1.569070 | 71.31 SL2 |
| 20) | −29.0821 | 0.1000 | | |
| 21) | 105.5941 | 3.3136 | 1.569070 | 71.31 SL3 |
| 22) | −70.6726 | 0.1000 | | |
| 23) | 53.5984 | 4.8476 | 1.487490 | 70.24 |
| 24) | −33.5783 | 1.0000 | 1.846660 | 23.78 |
| 25) | 910.5357 | | | |

[Aspherical Data]

Surface Number 2

κ = 0.0000
C4 = 4.14260E−06
C6 = −6.81570E−10
C8 = 1.45320E−11
C10 = −2.66210E−14
C12 = 0.19986E−16

Surface Number 6

κ = 1.0000
C4 = −1.80810E−06
C6 = 6.19130E−10
C8 = 1.37760E−12
C10 = 0.00000E+00

Surface Number 11

κ = 1.0000
C4 = 1.89370E−06
C6 = −1.46580E−10
C8 = 6.81130E−13
C10 = −1.80850E−15

[Variable Intervals]

| | Wide-angle | Intermediate | Telephoto |
|---|---|---|---|
| D5 | 42.29410 | 13.06960 | 1.75000 |
| D12 | 1.35000 | 15.18390 | 26.05090 |
| D18 | 15.70330 | 9.66630 | 3.42910 |

[Each Lens Block Magnification]

| | 1-POS | 2-POS | 3-POS |
|---|---|---|---|
| B(1–5) | 0.00000 | 0.00000 | 0.00000 |
| B(6–10) | −3.97099 | 7.28027 | 3.47100 |
| B(11–12) | 0.14288 | −0.14234 | −0.43910 |
| B(13–18) | −2.58318 | −2.00212 | −1.36104 |
| B(19–25) | −0.35980 | −0.48200 | −0.76335 |

| | 4-POS | 5-POS | 6-POS |
|---|---|---|---|
| β | −0.02500 | −0.02500 | −0.02500 |
| B(1–5) | 0.04810 | 0.02508 | 0.01580 |
| B(6–10) | −3.95130 | 7.28886 | 3.47837 |
| B(11–12) | 0.14280 | −0.14240 | −0.43915 |
| B(13–18) | −2.58219 | −2.00157 | −1.36083 |
| B(19–25) | −0.35991 | −0.48211 | −0.76346 |

| | 7-POS | 8-POS | 9-POS |
|---|---|---|---|
| β | −0.065 | −0.119 | −0.191 |
| B(1–5) | 0.12828 | 0.12023 | 0.12138 |
| B(6–10) | −3.93153 | 7.27265 | 3.51392 |
| B(11–12) | 0.14237 | −0.14389 | −0.44258 |
| B(13–18) | −2.57638 | −1.98963 | −1.34811 |
| B(19–25) | −0.36059 | −0.48462 | −0.77018 |

Figure 12A:
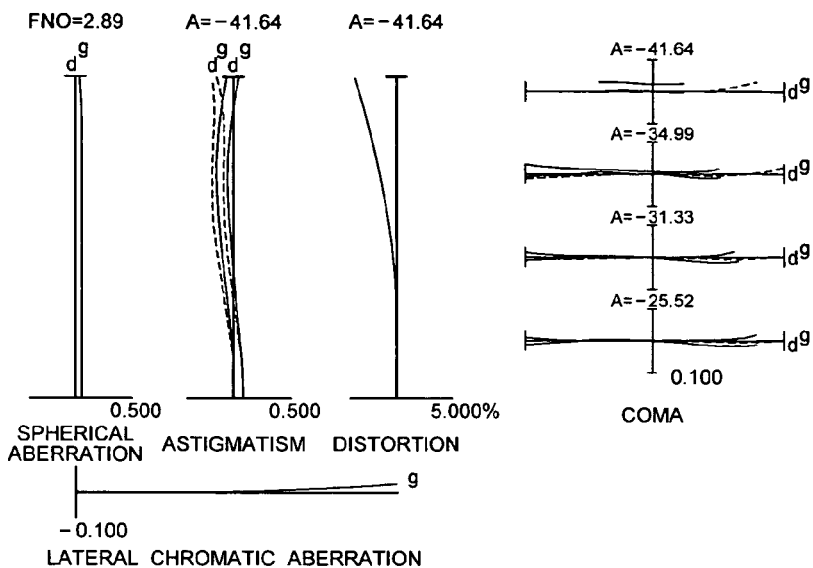
FIGS. 12A, 12B and 12C graphically show various aberrations of the zoom lens system according to Example 6 in a wide-angle end state, an intermediate focal length state, and a telephoto end state, respectively, when the system is focusing at infinity.
Figure 12B:
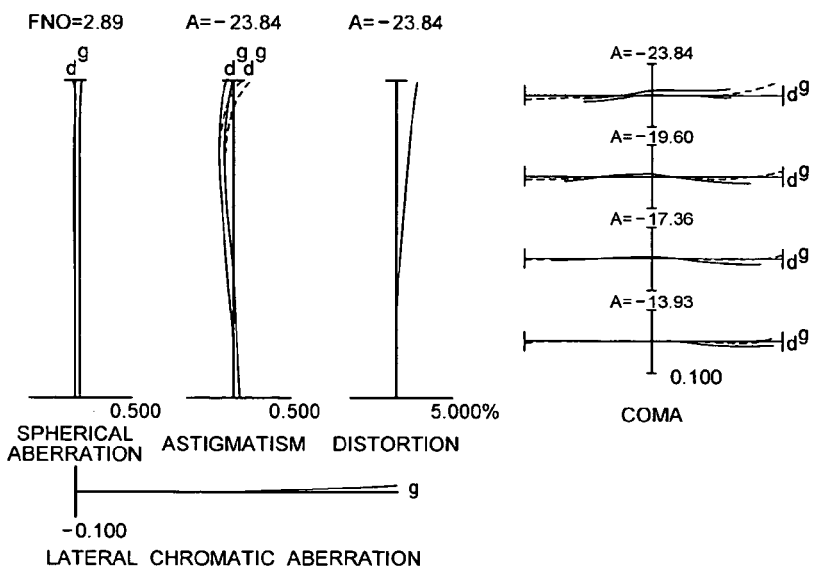
Figure 12C:
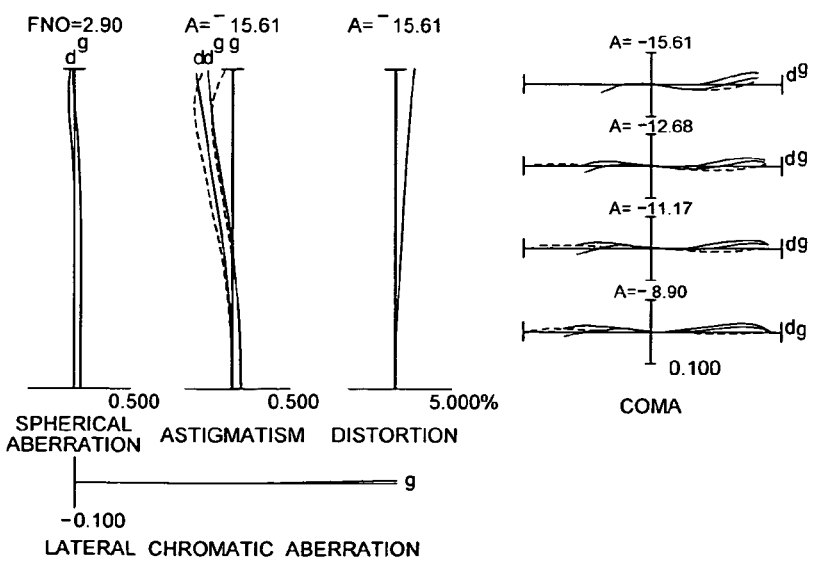

FIGS. 12A, 12B and 12C graphically show various aberrations of the zoom lens system according to Example 6 in a wide-angle end state, an intermediate focal length state, and a telephoto end state, respectively, when the system focusing at infinity.

As is apparent from the respective graphs, the zoom lens system according to Example 6 shows superb optical performance as a result of good corrections to various aberrations in each focal length state (the wide-angle end state, the intermediate focal length state, and the telephoto end state).

EXAMPLE 7

FIG. 13 is a diagram showing lens construction of a zoom lens system according to Example 7 of the present invention.

In a zoom lens system according to Example 7, the second negative lens SL1 from the object side of the first lens group G1 and the third positive lens SL2 from the object side of the fourth lens group G4 are made of the special glass. The negative lens SL1 made of the special glass has a double concave shape and is cemented with the third lens counted from the object side.

In a zoom lens system according to Example 7, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 7 are shown below in Table 7.

TABLE 7

[Specifications]

| | Wide-angle | Intermediate | Telephoto |
|---|---|---|---|
| f = | 17.55 | 33.69 | 52.7 |
| 2A = | 83.28 | 47.06 | 31.18° |
| FNO = | 2.89 | | |

[Lens Data]

| Surface Number | r | d | N | ν |
|---|---|---|---|---|
| 1) | 75.2416 | 2.5000 | 1.744429 | 49.52 |
| * 2) | 24.4203 | 22.9869 | | |
| 3) | −73.2333 | 1.3000 | 1.497820 | 82.52 SL1 |
| 4) | 67.4284 | 3.8020 | 1.805180 | 25.43 |
| 5) | 191.7932 | D5 | | |
| * 6) | 124.3238 | 5.0000 | 1.677900 | 55.34 |
| 7) | −96.4073 | 0.1000 | | |
| 8) | 73.8388 | 1.0000 | 1.846660 | 23.78 |
| 9) | 28.7333 | 5.2894 | 1.618000 | 63.38 |
| 10) | 214.2545 | 1.0047 | | |
| *11) | 50.1522 | 5.3179 | 1.744429 | 49.52 |
| 12) | −423.1456 | D12 | | |
| 13> | | 1.2000 | Aperture Stop S | |
| 14) | 386.2371 | 3.9848 | 1.846660 | 23.78 |
| 15) | −24.4665 | 1.0000 | 1.804000 | 46.58 |
| 16) | 135.0147 | 1.9000 | | |
| 17) | −33.8942 | 1.0000 | 1.804000 | 46.58 |
| 18) | 102.3985 | D18 | | |
| 19) | −295.8454 | 5.0000 | 1.618000 | 63.38 |
| 20) | −29.5940 | 0.1000 | | |
| 21) | 251.4924 | 3.0000 | 1.618000 | 63.38 |
| 22) | −69.5799 | 0.1000 | | |
| 23) | 48.1915 | 5.0395 | 1.497820 | 82.52 SL2 |
| 24) | −33.1614 | 1.0000 | 1.846660 | 23.78 |
| 25) | 1010.0399 | | | |

TABLE 7-continued

[Aspherical Data]

Surface Number 2

κ = 0.0000
C4 = 4.05150E−06
C6 = 1.80730E−10
C8 = 8.75620E−12
C10 = −1.35570E−14
C12 = 0.97404E−17
Surface Number 6

κ = 1.0000
C4 = −1.73030E−06
C6 = 6.55440E−10
C8 = 9.44940E−13
C10 = 0.00000E+00
Surface Number 11

κ = 1.0000
C4 = 1.84010E−06
C6 = −2.16860E−10
C8 = 1.05490E−12
C10 = −2.04800E−15

[Variable Intervals]

|     | Wide-angle | Intermediate | Telephoto |
| --- | --- | --- | --- |
| D5  | 42.29670 | 12.65500 | 1.75000 |
| D12 | 1.35000  | 15.88280 | 26.97720 |
| D18 | 14.97470 | 9.12920  | 2.99450 |

[Each Lens Block Magnification]

|     | 1-POS | 2-POS | 3-POS |
| --- | --- | --- | --- |
| B(1–5)   | 0.00000  | 0.00000  | 0.00000 |
| B(6–10)  | −3.98332 | 7.02463  | 3.48327 |
| B(11–12) | 0.14271  | −0.14931 | −0.43696 |
| B(13–18) | −2.49542 | −1.97558 | 1.39242 |
| B(19–25) | −0.36723 | −0.48260 | −0.73812 |

|     | 4-POS | 5-POS | 6-POS |
| --- | --- | --- | --- |
| β        | −0.02500 | −0.02500 | −0.02500 |
| B(1–5)   | 0.04869  | 0.02507  | 0.01599 |
| B(6–10)  | −3.96324 | 7.03353  | 3.49079 |
| B(11–12) | 0.14264  | −0.14938 | −0.43702 |
| B(13–18) | −2.49447 | −1.97503 | −1.39219 |
| B(19–25) | −0.36735 | −0.48272 | −0.73824 |

|     | 7-POS | 8-POS | 9-POS |
| --- | --- | --- | --- |
| β        | −0.065   | −0.120   | −0.190 |
| B(1–5)   | 0.12923  | 0.12124  | 0.12231 |
| B(6–10)  | −3.94326 | 7.02137  | 3.52682 |
| B(11–12) | 0.14220  | −0.15092 | −0.44048 |
| B(13–18) | −2.48896 | −1.96289 | −1.37870 |
| B(19–25) | −0.36803 | −0.48530 | −0.74498 |

Figure 14A:
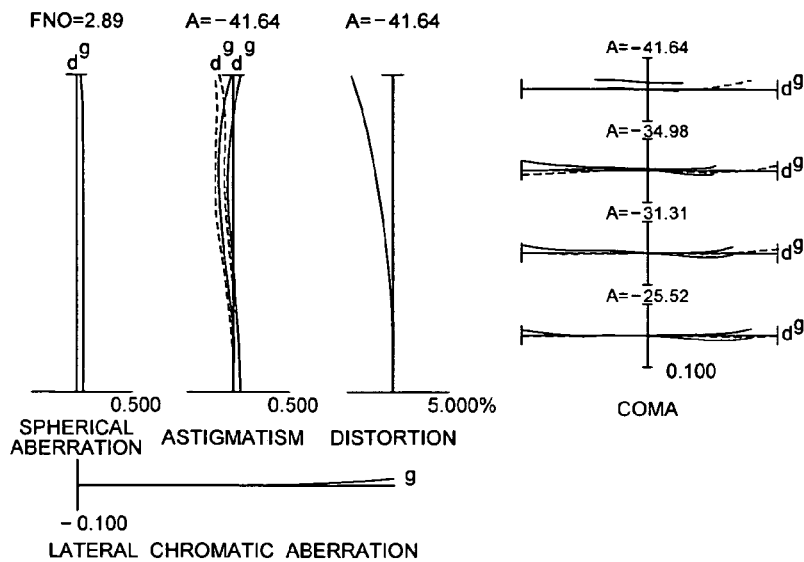
FIGS. 14A, 14B and 14C graphically show various aberrations of the zoom lens system according to Example 7 in a wide-angle end state, an intermediate focal length state, and a telephoto end state, respectively, when the system is focusing at infinity.
Figure 14B:
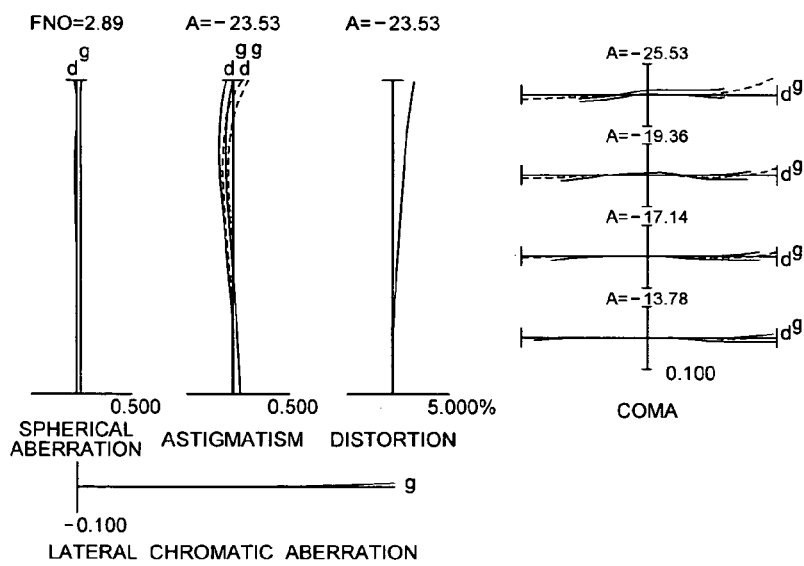
Figure 14C:
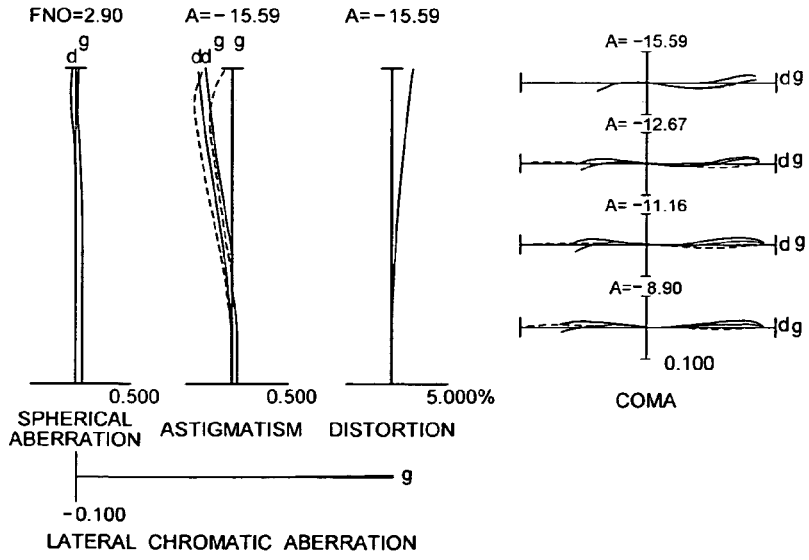

FIGS. 14A, 14B and 14C graphically show various aberrations of the zoom lens system according to Example 7 in a wide-angle end state, an intermediate focal length state, and a telephoto end state, respectively, when the system focusing at infinity.

As is apparent from the respective graphs, the zoom lens system according to Example 7 shows superb optical performance as a result of good corrections to various aberrations in each focal length state (the wide-angle end state, the intermediate focal length state, and the telephoto end state).

EXAMPLE 8

FIG. 15 is a diagram showing lens construction of a zoom lens system according to Example 8 of the present invention.

In a zoom lens system according to Example 8, the first negative lens SL1 from the object side of the first lens group G1 and the second positive lens SL2 and the third positive lens SL3 from the object side of the fourth lens group G4 are made of the special glass.

In a zoom lens system according to Example 8, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 8 are shown below in Table 8.

TABLE 8

[Specifications]

|       | Wide-angle | Intermediate | Telephoto |
| ---   | --- | --- | --- |
| f =   | 17.55 | 33.80 | 53.4 |
| 2A =  | 83.36 | 46.86 | 30.78° |
| FNO = | 2.89  |       |       |

[Lens Data]

| Surface Number | r | d | N | ν | |
| --- | --- | --- | --- | --- | --- |
| 1)  | 88.4857    | 2.0000  | 1.569070 | 71.31 | SL1 |
| 2)  | 23.1237    | 12.5909 |          |       |     |
| 3)  | 1676.3197  | 2.0000  | 1.796681 | 45.37 |     |
| *4) | 37.3077    | 5.6615  |          |       |     |
| 5)  | 79.7028    | 3.3257  | 1.805180 | 25.43 |     |
| 6)  | 1620.6953  | D6      |          |       |     |
| *7) | 134.8418   | 5.0000  | 1.677900 | 55.34 |     |
| 8)  | −102.4648  | 0.1000  |          |       |     |
| 9)  | 125.7885   | 1.0000  | 1.805180 | 25.43 |     |
| 10) | 33.4567    | 7.0000  | 1.618000 | 63.38 |     |
| 11) | −2913.5812 | 5.5422  |          |       |     |
| *12)| 53.4429    | 6.0000  | 1.589130 | 61.18 |     |
| 13) | −123.9664  | D13     |          |       |     |
| 14> |            | 1.2000  | Aperture Stop S | | |
| 15) | 152.1655   | 4.0000  | 1.846660 | 23.78 |     |
| 16) | −31.2559   | 1.0000  | 1.804000 | 46.58 |     |
| 17) | 104.9708   | 1.8127  |          |       |     |
| 18) | −39.8203   | 1.0000  | 1.804000 | 46.58 |     |
| 19) | 91.7813    | D19     |          |       |     |
| 20) | −530.1722  | 4.9750  | 1.618000 | 63.38 |     |
| 21) | −31.9506   | 1.7123  |          |       |     |
| 22) | 193.3336   | 3.0000  | 1.518601 | 69.98 | SL2 |
| 23) | −83.1397   | 0.1000  | 1.000000 |       |     |
| 24) | 58.3456    | 5.0292  | 1.518601 | 69.98 | SL3 |
| 25) | −31.3537   | 1.0000  | 1.846660 | 23.78 |     |
| 26) | −447.5858  |         |          |       |     |

[Aspherical Data]

Surface Number 4

κ = 0.0000
C4 = −5.36480E−06
C6 = −1.71290E−09
C8 = 4.22100E−12
C10 = −2.13050E−14
C12 = 0.16581E−16
Surface Number 7

κ = 1.0000
C4 = −2.14990E−06
C6 = 2.70180E−09
C8 = −1.00150E−12
C10 = 0.00000E+00
Surface Number 12

κ = 1.0000
C4 = 1.65360E−06
C6 = −2.67510E−09

TABLE 8-continued

C8 = 2.47720E-12
C10 = -3.01900E-15

[Variable Intervals]

| | Wide-angle | Intermediate | Telephoto |
|---|---|---|---|
| D6 | 44.20260 | 13.46390 | 1.75000 |
| D13 | 1.35000 | 19.48370 | 33.77710 |
| D19 | 18.02270 | 11.52620 | 2.63440 |

[Each Lens Block Magnification]

| | 1-POS | 2-POS | 3-POS |
|---|---|---|---|
| B(1–6) | 0.00000 | 0.00000 | 0.00000 |
| B(7–11) | -4.30819 | 6.45890 | 3.30819 |
| B(12–13) | 0.13576 | -0.16783 | -0.48561 |
| B(14–19) | -3.17928 | -2.82367 | -1.87713 |
| B(20–26) | -0.27919 | -0.32670 | -0.52381 |

| | 4-POS | 5-POS | 6-POS |
|---|---|---|---|
| β | -0.02500 | -0.02500 | -0.02500 |
| B(1–6) | 0.04882 | 0.02507 | 0.01584 |
| B(7–11) | -4.28973 | 6.46779 | 3.31537 |
| B(12–13) | 0.13568 | -0.16790 | -0.48567 |
| B(14–19) | -3.17785 | -2.82263 | -1.87673 |
| B(20–26) | -0.27930 | -0.32680 | -0.52392 |

| | 7-POS | 8-POS | 9-POS |
|---|---|---|---|
| β | -0.067 | -0.123 | -0.196 |
| B(1–6) | 0.13309 | 0.12456 | 0.12490 |
| B(7–11) | -4.27360 | 6.46338 | 3.35220 |
| B(12–13) | 0.13521 | -0.16954 | -0.48946 |
| B(14–19) | -3.16900 | -2.79827 | -1.85197 |
| B(20–26) | -0.27996 | -0.32931 | -0.53049 |

Figure 16A:
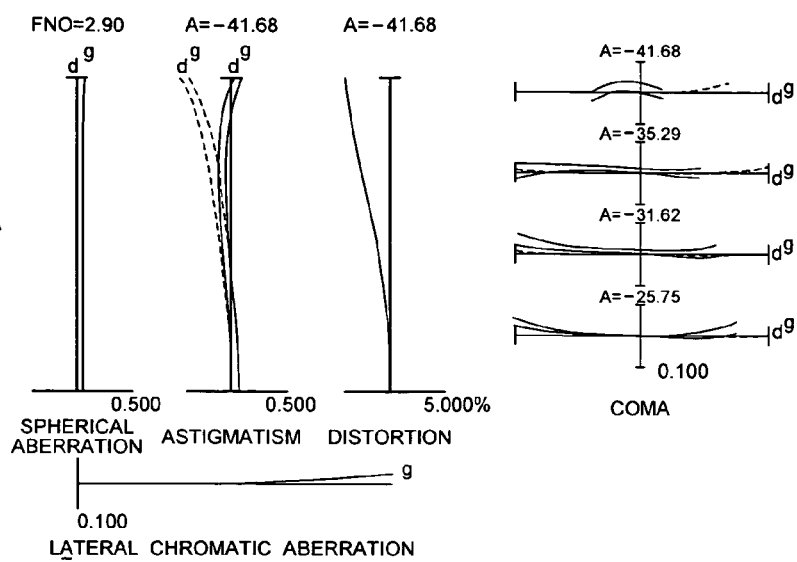
FIGS. 16A, 16B and 16C graphically show various aberrations of the zoom lens system according to Example 8 in a wide-angle end state, an intermediate focal length state, and a telephoto end state, respectively, when the system is focusing at infinity.
Figure 16B:
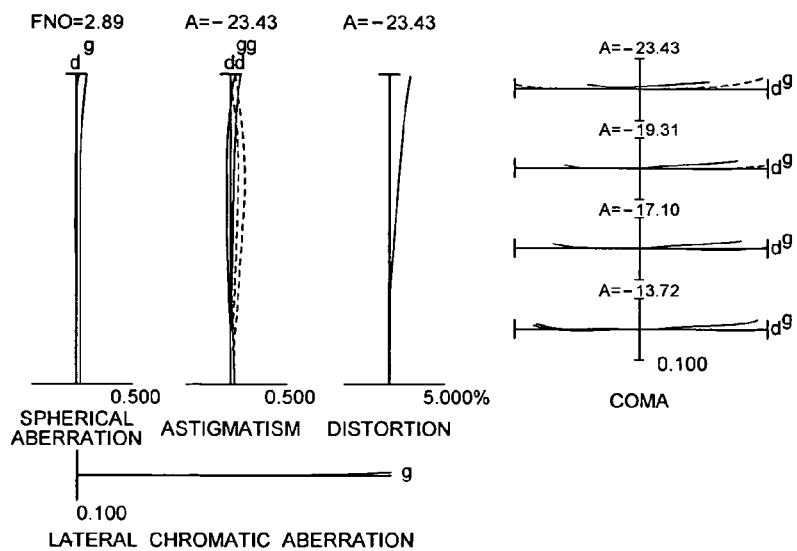
Figure 16C:
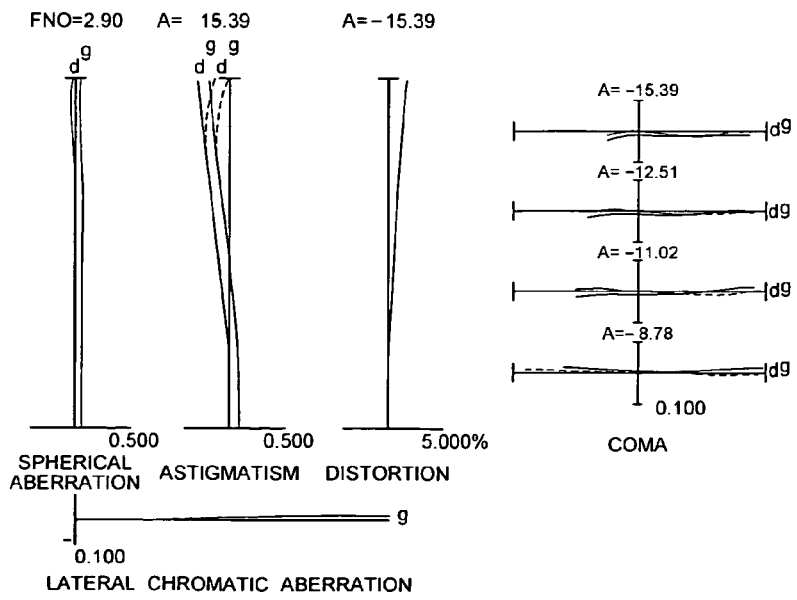

FIGS. 16A, 16B and 16C graphically show various aberrations of the zoom lens system according to Example 8 in a wide-angle end state, an intermediate focal length state, and a telephoto end state, respectively, when the system focusing at infinity.

As is apparent from the respective graphs, the zoom lens system according to Example 8 shows superb optical performance as a result of good corrections to various aberrations in each focal length state (the wide-angle end state, the intermediate focal length state, and the telephoto end state).

EXAMPLE 9

FIG. 17 is a diagram showing lens construction of a zoom lens system according to Example 9 of the present invention.

In a zoom lens system according to Example 9, the second negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the third lens counted from the object side.

In a zoom lens system according to Example 9, focusing from infinity to a close object is carried out by moving a cemented lens constructed by a second lens cemented with a third lens from the object side of the first lens group G1 in a body along the optical axis to the object side.

Various values of a zoom lens system according to Example 9 are shown below in Table 9.

TABLE 9

[Specifications]

| | Wide-angle | Intermediate | Telephoto |
|---|---|---|---|
| f = | 17.55 | 33.28 | 53.4 |
| 2A = | 83.28 | 47.46 | 30.76° |
| FNO = | 2.89 | | |

[Lens Data]

| Surface Number | r | d | N | ν |
|---|---|---|---|---|
| 1) | 70.0050 | 2.5000 | 1.796681 | 45.37 |
| * 2) | 23.6632 | 22.6015 | | |
| 3) | -53.0877 | 1.3000 | 1.569070 | 71.31 SL1 |
| 4) | 147.3487 | 3.1049 | 1.805180 | 25.43 |
| 5) | -247.1033 | D5 | | |
| * 6) | 101.4149 | 4.3103 | 1.677900 | 55.34 |
| 7) | -109.1898 | 0.1000 | | |
| 8) | 140.9023 | 1.0000 | 1.846660 | 23.78 |
| 9) | 35.0192 | 6.0000 | 1.618000 | 63.38 |
| 10) | 0.0000 | 1.0000 | | |
| 11) | 46.8922 | 4.7772 | 1.804000 | 46.58 |
| 12) | 1488.0121 | D12 | | |
| 13> | | 1.4911 | Aperture Stop S | |
| 14) | 1187.0445 | 4.0000 | 1.846660 | 23.78 |
| 15) | -24.5906 | 1.0000 | 1.804000 | 46.58 |
| 16) | 193.7074 | 1.7281 | | |
| 17) | -35.6829 | 2.0000 | 1.804000 | 46.58 |
| 18) | 101.5499 | D18 | | |
| 19) | -183.6244 | 5.0000 | 1.497820 | 82.52 SL2 |
| 20) | -27.0329 | 0.1000 | | |
| 21) | 164.3441 | 3.9943 | 1.618000 | 63.38 |
| 22) | -88.5316 | 0.1000 | | |
| 23) | 50.7138 | 5.3451 | 1.497820 | 82.52 SL3 |
| 24) | -33.3941 | 1.0000 | 1.846660 | 23.78 |
| 25) | -315.0653 | | | |

[Aspherical Data]

Surface Number 2

κ = 0.0000
C4 = 4.38410E-06
C6 = -1.46960E-09
C8 = 1.74830E-11
C10 = -3.14280E-14
C12 = 0.22738E-16

Surface Number 6

κ = 1.0000
C4 = -1.05100E-08
C6 = -4.11860E-10
C8 = 1.21380E-12
C10 = 0.00000E+00

[Variable Intervals]

| | Wide-angle | Intermediate | Telephoto |
|---|---|---|---|
| D5 | 42.50360 | 13.07170 | 1.75760 |
| D12 | 3.37700 | 17.29450 | 29.77550 |
| D18 | 16.52710 | 10.37550 | 3.17040 |

[Each Lens Block Magnification]

| | 1-POS | 2-POS | 3-POS |
|---|---|---|---|
| B(1–2) | 0.00000 | 0.00000 | 0.00000 |
| B(3–5) | 0.72388 | 0.72388 | 0.72388 |
| B(6–12) | -0.57030 | -1.06260 | -1.59034 |
| B(13–18) | -2.92876 | -2.13575 | -1.46409 |
| B(19–25) | -0.31577 | -0.44064 | -0.68922 |

| | 4-POS | 5-POS | 6-POS |
|---|---|---|---|
| β | -0.02500 | -0.02500 | -0.02500 |
| B(1–2) | 0.06429 | 0.03421 | 0.02139 |

TABLE 9-continued

| | 7-POS | 8-POS | 9-POS |
|---|---|---|---|
| B(3–5) | 0.74365 | 0.73414 | 0.73023 |
| B(6–12) | −0.57042 | −1.06272 | −1.59044 |
| B(13–18) | −2.92752 | −2.13512 | −1.46383 |
| B(19–25) | −0.31588 | −0.44075 | −0.68933 |

| | 7-POS | 8-POS | 9-POS |
|---|---|---|---|
| β | −0.069 | −0.123 | −0.199 |
| B(1–2) | 0.17179 | 0.16130 | 0.16270 |
| B(3–5) | 0.78256 | 0.77835 | 0.77890 |
| B(6–12) | −0.57126 | −1.06552 | −1.59700 |
| B(13–18) | −2.91913 | −2.12028 | −1.44754 |
| B(19–25) | −0.31664 | −0.44337 | −0.69641 |

Figure 18A:
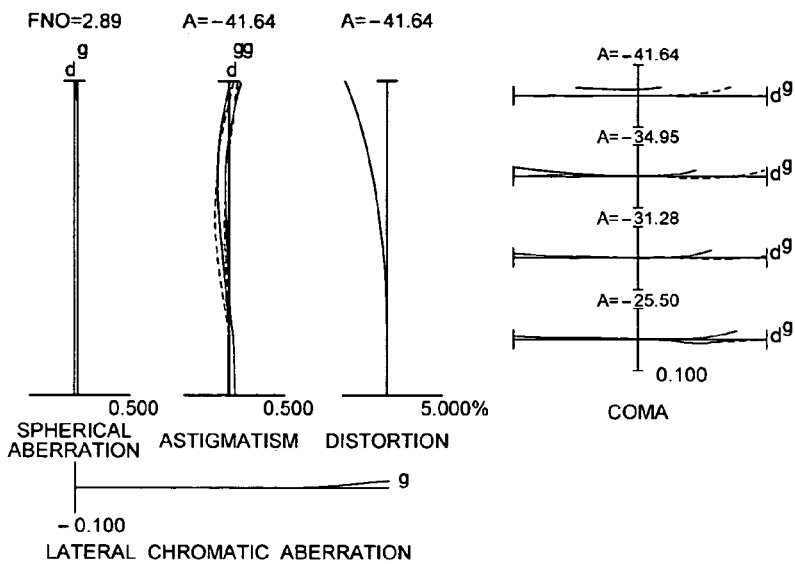
FIGS. 18A, 18B and 18C graphically show various aberrations of the zoom lens system according to Example 9 in a wide-angle end state, an intermediate focal length state, and a telephoto end state, respectively, when the system is focusing at infinity.
Figure 18B:
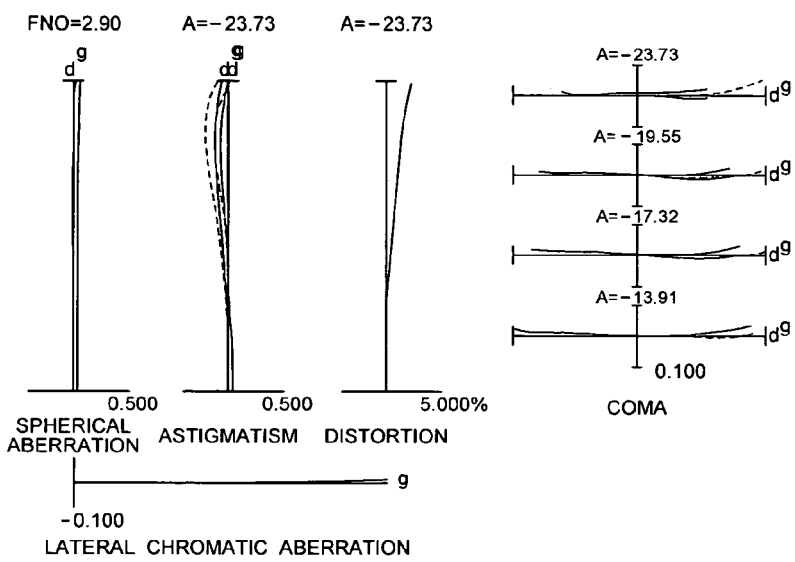
Figure 18C:
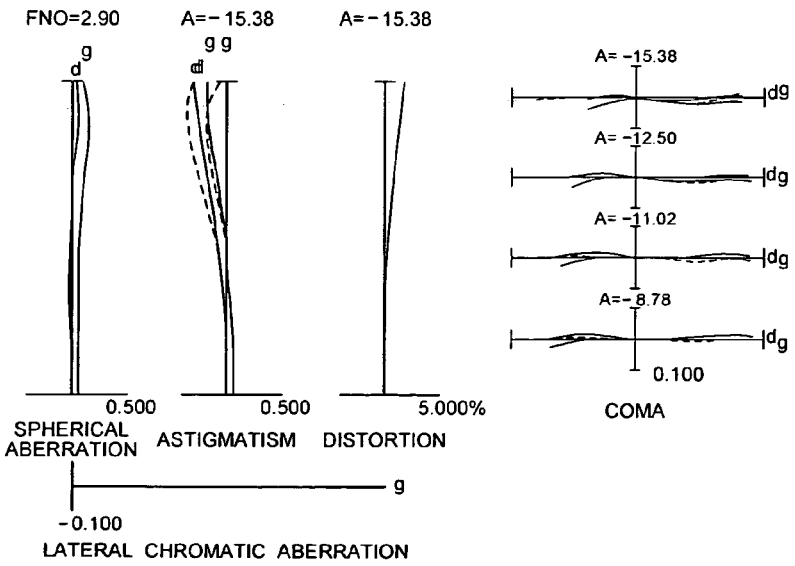

FIGS. 18A, 18B and 18C graphically show various aberrations of the zoom lens system according to Example 9 in a wide-angle end state, an intermediate focal length state, and a telephoto end state, respectively, when the system focusing at infinity.

As is apparent from the respective graphs, the zoom lens system according to Example 9 shows superb optical performance as a result of good corrections to various aberrations in each focal length state (the wide-angle end state, the intermediate focal length state, and the telephoto end state).

EXAMPLE 10

Figure 19:
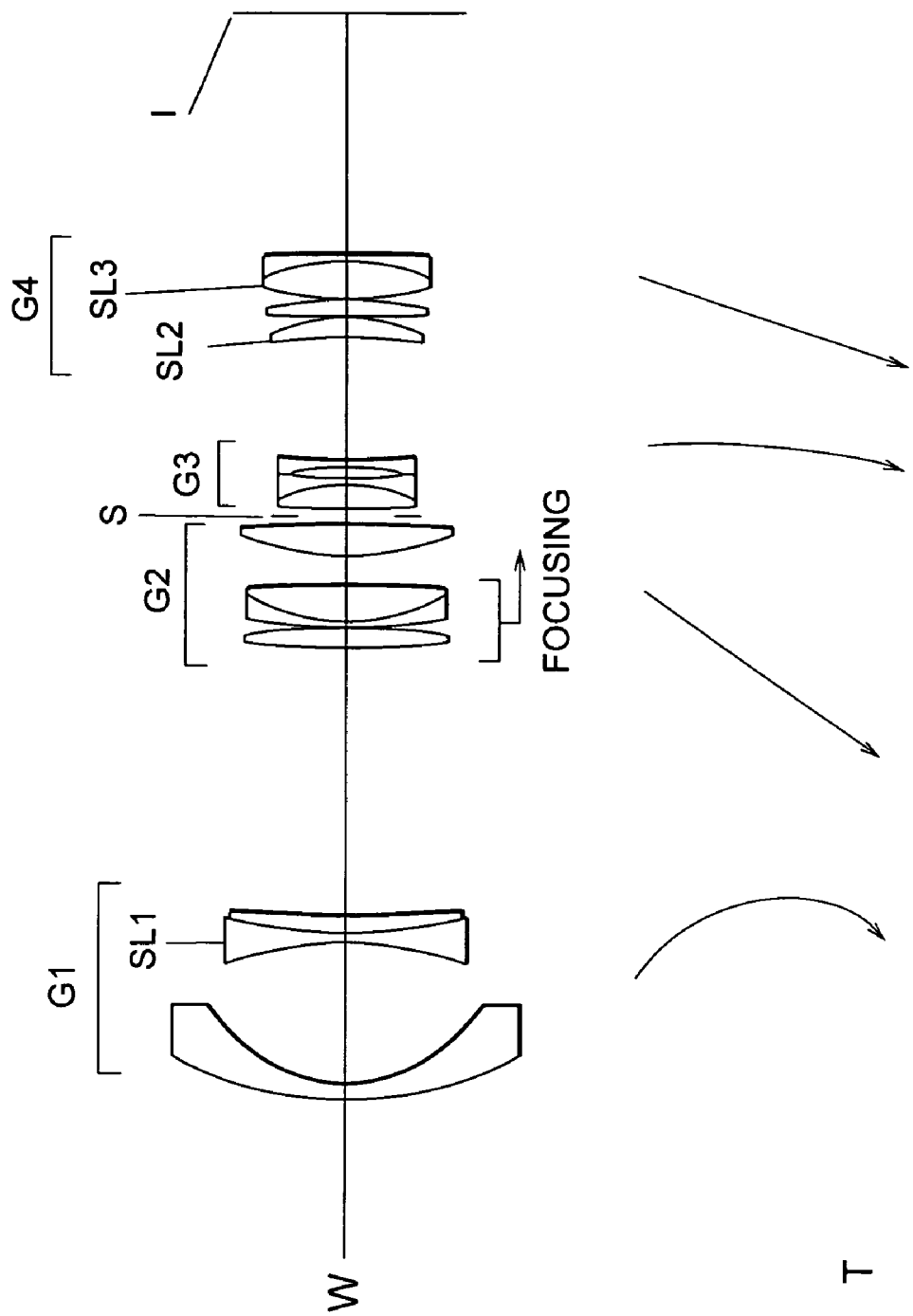
FIG. 19 is a diagram showing lens construction of a zoom lens system according to Example 10 of the present invention.

FIG. 19 is a diagram showing lens construction of a zoom lens system according to Example 10 of the present invention.

In a zoom lens system according to Example 10, the second negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the third lens counted from the object side.

In a zoom lens system according to Example 10, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 10 are shown below in Table 10.

TABLE 10

[Specifications]

| | Wide-angle | Intermediate | Telephoto |
|---|---|---|---|
| f = | 17.50 | 31.433 | 53.4 |
| 2A = | 83.44 | 49.96 | 30.78° |
| FNO = | 2.88 | | |

[Lens Data]

| Surface Number | r | d | N | ν | |
|---|---|---|---|---|---|
| 1) | 61.1778 | 2.5000 | 1.796681 | 45.37 | |
| *2) | 23.8595 | 22.2571 | | | |
| 3) | −53.4452 | 1.3000 | 1.497820 | 82.52 | SL1 |
| 4) | 74.5711 | 2.8345 | 1.805180 | 25.43 | |
| 5) | 251.1650 | D5 | | | |
| *6) | 144.7881 | 3.2432 | 1.669100 | 55.39 | |
| 7) | 101.9877 | 0.1000 | | | |
| 8) | 115.7173 | 1.0000 | 1.846660 | 23.78 | |
| 9) | 33.8371 | 5.6799 | 1.618000 | 63.38 | |
| 10) | −316.7089 | 1.0036 | | | |
| *11) | 54.0448 | 4.9363 | 1.744429 | 49.52 | |
| 12) | −201.4533 | D12 | | | |
| 13> | | 1.2000 | Aperture Stop S | | |
| 14) | 195.2821 | 3.6562 | 1.846660 | 23.78 | |
| 15) | −28.8371 | 1.0000 | 1.804000 | 46.58 | |
| 16) | 92.5612 | 1.9195 | | | |
| 17) | −39.0662 | 1.0000 | 1.804000 | 46.58 | |
| 18) | 115.0637 | D18 | | | |
| 19) | −89.5048 | 3.2808 | 1.497820 | 82.52 | SL2 |
| 20) | −27.7764 | 0.1000 | | | |
| 21) | 335.0242 | 2.6731 | 1.618000 | 63.38 | |
| 22) | −64.1525 | 0.1077 | | | |
| 23) | 49.9637 | 6.1661 | 1.497820 | 82.52 | SL3 |
| 24) | −32.4974 | 1.0000 | 1.846660 | 23.78 | |
| 25) | −283.4287 | | | | |

[Aspherical Data]

Surface Number 2

κ = 0.0000
C4 = 4.59450E−06
C6 = 6.67330E−10
C8 = 7.66470E−12
C10 = −9.79900E−15
C12 = 0.59536E−17

Surface Number 6

κ = 1.0000
C4 = −1.84030E−06
C6 = −3.89750E−12
C8 = 2.85600E−12
C10 = 0.00000E+00

Surface Number 11

κ = 1.0000
C4 = 1.39700E−06
C6 = −3.54520E−11
C8 = −6.71070E−13
C10 = −4.17940E−16

[Variable Intervals]

| | Wide-angle | Intermediate | Telephoto |
|---|---|---|---|
| D5 | 42.84360 | 14.89650 | 1.75000 |
| D12 | 1.35000 | 13.32930 | 27.30380 |
| D18 | 19.73850 | 14.04300 | 5.54860 |

[Each Lens Block Magnification]

| | 1-POS | 2-POS | 3-POS |
|---|---|---|---|
| B(1–5) | 0.00000 | 0.00000 | 0.00000 |
| B(6–10) | −4.15384 | 7.21257 | 3.15345 |
| B(11–12) | 0.13506 | −0.14079 | −0.52025 |
| B(13–18) | −4.57979 | −2.96156 | −1.73145 |
| B(19–25) | −0.21668 | −0.33252 | −0.59806 |

| | 4-POS | 5-POS | 6-POS |
|---|---|---|---|
| β | −0.02500 | −0.02500 | −0.02500 |
| B(1–5) | 0.04513 | 0.02496 | 0.01468 |
| B(6–10) | −4.13339 | 7.22343 | 3.16041 |
| B(11–12) | 0.13506 | −0.14079 | −0.52025 |
| B(13–18) | −4.57979 | −2.96157 | −1.73145 |
| B(19–25) | −0.21668 | −0.33252 | −0.59806 |

| | 7-POS | 8-POS | 9-POS |
|---|---|---|---|
| β | −0.065 | −0.112 | −0.194 |
| B(1–5) | 0.11855 | 0.11125 | 0.11209 |
| B(6–10) | −4.10010 | 7.26096 | 3.20652 |

TABLE 10-continued

| | | | |
|---|---|---|---|
| B(11–12) | 0.13506 | −0.14079 | −0.52025 |
| B(13–18) | −4.57979 | −2.96156 | −1.73145 |
| B(19–25) | −0.21668 | −0.33252 | −0.59806 |

Figure 20A:
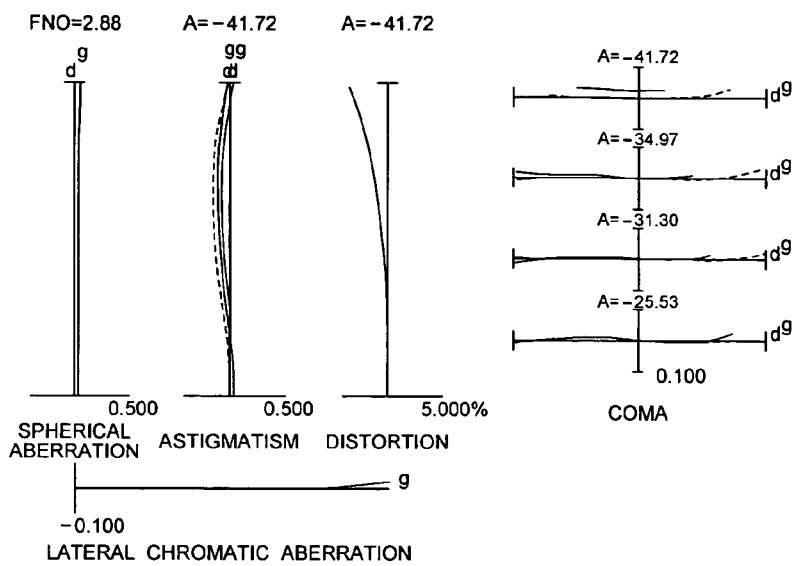
FIGS. 20A, 20B and 20C graphically show various aberrations of the zoom lens system according to Example 10 in a wide-angle end state, an intermediate focal length state, and a telephoto end state, respectively, when the system is focusing at infinity.
Figure 20B:
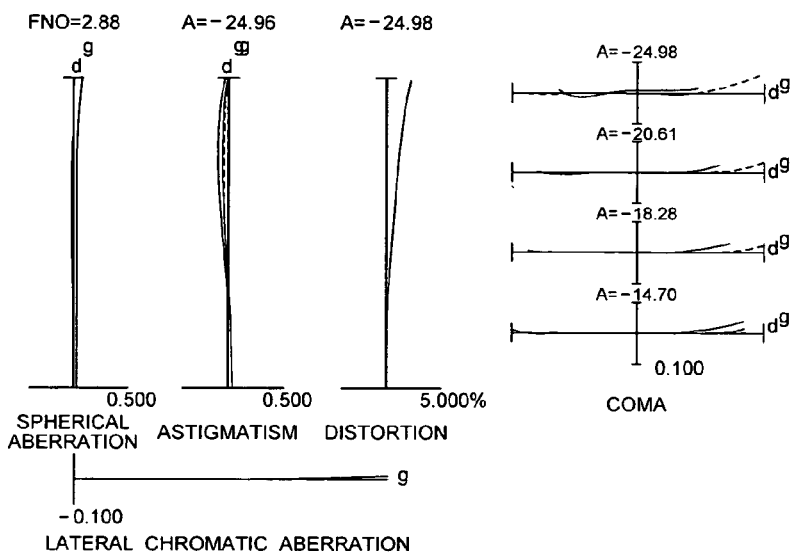
Figure 20C:
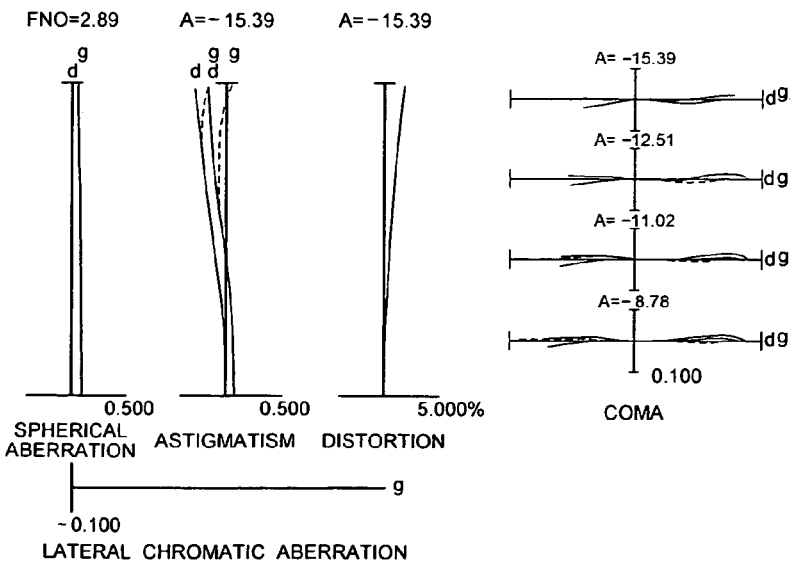

FIGS. 20A, 20B and 20C graphically show various aberrations of the zoom lens system according to Example 10 in a wide-angle end state, an intermediate focal length state, and a telephoto end state, respectively, when the system focusing at infinity.

As is apparent from the respective graphs, the zoom lens system according to Example 10 shows superb optical performance as a result of good corrections to various aberrations in each focal length state (the wide-angle end state, the intermediate focal length state, and the telephoto end state).

EXAMPLE 11

Figure 21:
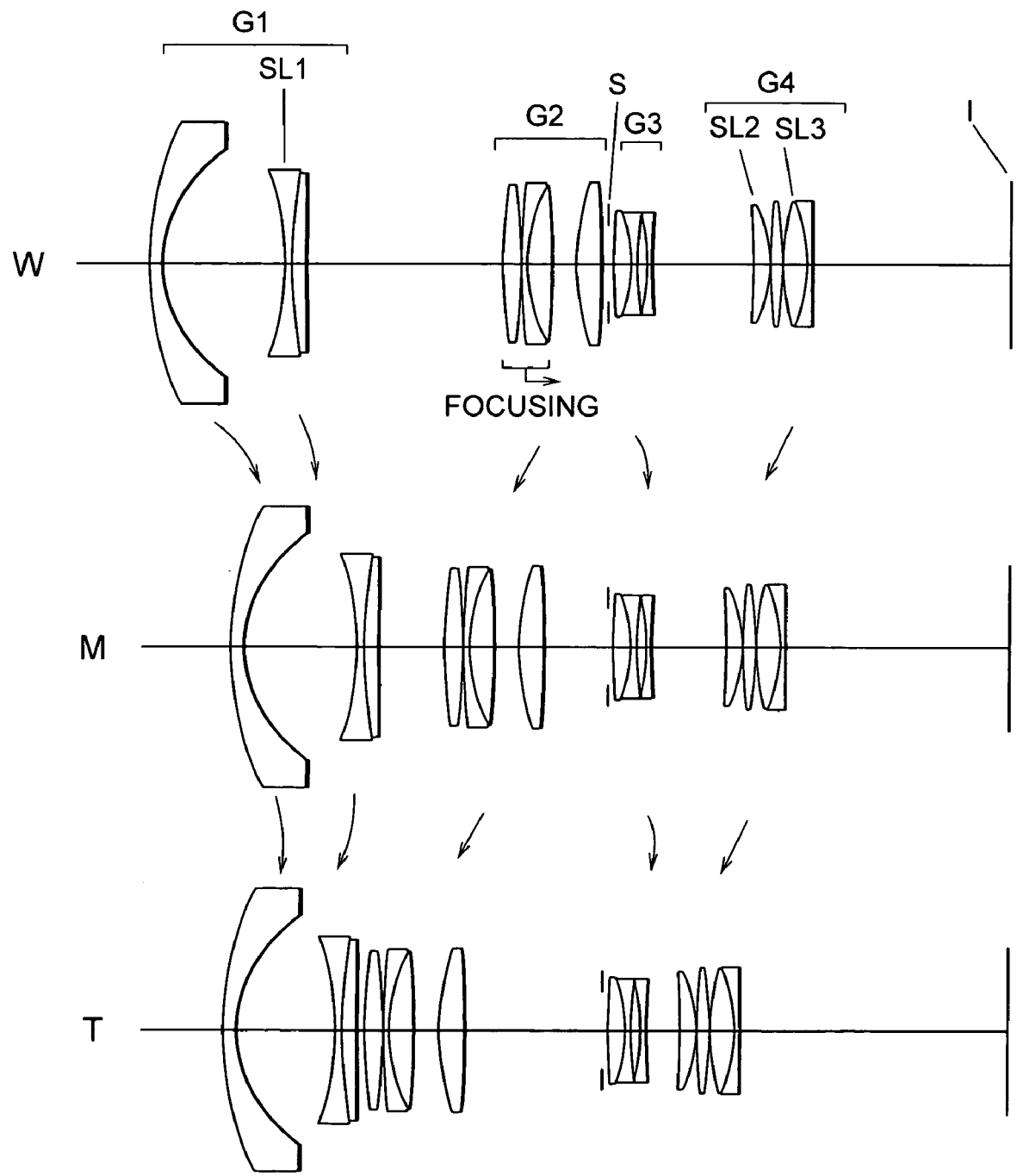
FIG. 21 is a diagram showing lens construction of a zoom lens system according to Example 11 of the present invention.

FIG. 21 is a diagram showing lens construction of a zoom lens system according to Example 11 of the present invention.

In a zoom lens system according to Example 11, the second negative lens SL1 from the object side of the first lens group G1 and the first positive lens SL2 and the third positive lens SL3 from the object side of the fourth lens group G4 are made of the special glass. The negative lens SL1 made of the special glass has a double concave shape and is cemented with the third lens counted from the object side.

Moreover, in a zoom lens system according to the present invention, the first lens group is composed of, in order from the object, a first sub-lens group having negative refractive power and a second sub-lens group having negative refractive power, and when the state of lens group positions varies from a wide-angle end state to a telephoto end state, the distance between the first sub-lens group and the second sub-lens group varies.

In a zoom lens system according to Example 11, focusing from infinity to a close object is carried out by moving a first lens from the object side of the second lens group G2 and a cemented lens constructed by a second lens cemented with a third lens from the object side of the second lens group G2 in a body along the optical axis to the image side.

Various values of a zoom lens system according to Example 11 are shown below in Table 11.

TABLE 11

[Specifications]

| | Wide-angle | Intermediate | Telephoto |
|---|---|---|---|
| f = | 17.55 | 31.40 | 53.40 |
| 2A = | 83.28 | 50.18 | 30.78° |
| FNO = | 2.89 | | |

[Lens Data]

| Surface Number | r | d | N | ν | |
|---|---|---|---|---|---|
| 1) | 67.6513 | 2.5000 | 1.743200 | 49.32 | |
| *2) | 23.6527 | D2 | | | |
| 3) | −49.9444 | 1.3000 | 1.569070 | 71.31 | SL1 |
| 4) | 113.1596 | 2.9289 | 1.805180 | 25.43 | |
| 5) | −830.9597 | D5 | | | |
| *6) | 104.5105 | 3.7346 | 1.677900 | 55.34 | |

TABLE 11-continued

| | | | | | |
|---|---|---|---|---|---|
| 7) | −114.5393 | 0.1000 | | | |
| 8) | 189.2979 | 1.0000 | 1.846660 | 23.78 | |
| 9) | 35.3862 | 5.0695 | 1.618000 | 63.38 | |
| 10) | −176.5596 | 4.9882 | | | |
| *11) | 56.6910 | 5.0020 | 1.785900 | 44.20 | |
| 12) | −234.1086 | D12 | | | |
| 13> | | 1.2000 | | Aperture Stop S | |
| 14) | 172.3609 | 3.7322 | 1.846660 | 23.78 | |
| 15) | −28.5367 | 1.0000 | 1.804000 | 46.58 | |
| 16) | 86.6859 | 1.9000 | | | |
| 17) | −39.2371 | 1.0000 | 1.804000 | 46.58 | |
| 18) | 112.6098 | D18 | | | |
| 19) | −133.1178 | 3.3252 | 1.497820 | 82.52 | SL2 |
| 20) | −28.5516 | 0.1567 | | | |
| 21) | 211.5776 | 2.3737 | 1.618000 | 63.38 | |
| 22) | −75.1409 | 0.1000 | | | |
| 23) | 51.6235 | 4.8972 | 1.497820 | 82.52 | SL3 |
| 24) | −34.3849 | 1.0000 | 1.846660 | 23.78 | |
| 25) | −427.3116 | | | | |

[Aspherical Data]

Surface Number 2

$\kappa = 0.0000$
$C4 = 4.28380E-06$
$C6 = -7.56490E-10$
$C8 = 1.15870E-11$
$C10 = -1.77280E-14$
$C12 = 0.95593E-17$ Surface Number 6

$\kappa = 1.0000$
$C4 = -1.89010E-06$
$C6 = -8.18450E-10$
$C8 = 3.98740E-12$
$C10 = 0.00000E+00$ Surface Number 11

$\kappa = 1.0000$
$C4 = 1.23850E-06$
$C6 = 5.67630E-10$
$C8 = -1.08830E-12$
$C10 = -7.59160E-16$

[Variable Intervals]

| | Wide-angle | Intermediate | Telephoto |
|---|---|---|---|
| D2 | 25.08120 | 23.14950 | 20.08280 |
| D5 | 39.35450 | 13.13730 | 1.75000 |
| D12 | 1.35000 | 12.95820 | 27.64810 |
| D18 | 20.54690 | 14.98470 | 6.93990 |

[Each Lens Block Magnification]

| | 1-POS | 2-POS | 3-POS |
|---|---|---|---|
| B(1–2) | 0.00000 | 0.00000 | 0.00000 |
| B(3–5) | 0.61981 | 0.62603 | 0.63616 |
| B(6–10) | −4.25028 | 7.42456 | 3.25023 |
| B(11–12) | 0.13561 | −0.13949 | −0.50784 |
| B(13–18) | −4.26776 | −2.70169 | −1.73070 |
| B(19–25) | −0.22953 | −0.35739 | −0.58593 |

| | 4-POS | 5-POS | 6-POS |
|---|---|---|---|
| β | −0.02500 | −0.02500 | −0.02500 |
| B(1–2) | 0.07047 | 0.03947 | 0.02328 |
| B(3–5) | 0.63128 | 0.63253 | 0.64011 |
| B(6–10) | −4.23109 | 7.43551 | 3.25743 |
| B(11–12) | 0.13561 | −0.13949 | −0.50784 |
| B(13–18) | −4.26776 | −2.70169 | −1.73070 |
| B(19–25) | −0.22953 | −0.35739 | −0.58593 |

| | 7-POS | 8-POS | 9-POS |
|---|---|---|---|
| β | −0.06515 | −0.11155 | −0.19221 |
| B(1–2) | 0.17978 | 0.16922 | 0.16956 |

TABLE 11-continued

| | | | |
|---|---|---|---|
| B(3–5) | 0.64994 | 0.65489 | 0.66605 |
| B(6–10) | −4.19750 | 7.47317 | 3.30474 |
| B(11–12) | 0.13561 | −0.13949 | −0.50784 |
| B(13–18) | −4.26776 | −2.70169 | −1.73070 |
| B(19–25) | −0.22953 | −0.35739 | −0.58593 |

Figure 22A:
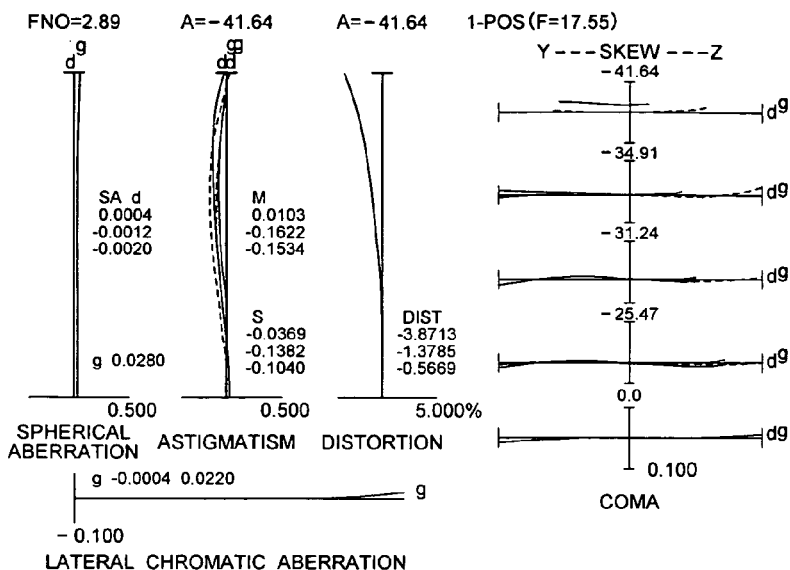
FIGS. 22A, 22B and 22C graphically show various aberrations of the zoom lens system according to Example 11 in a wide-angle end state, an intermediate focal length state, and a telephoto end state, respectively, when the system is focusing at infinity.
Figure 22B:
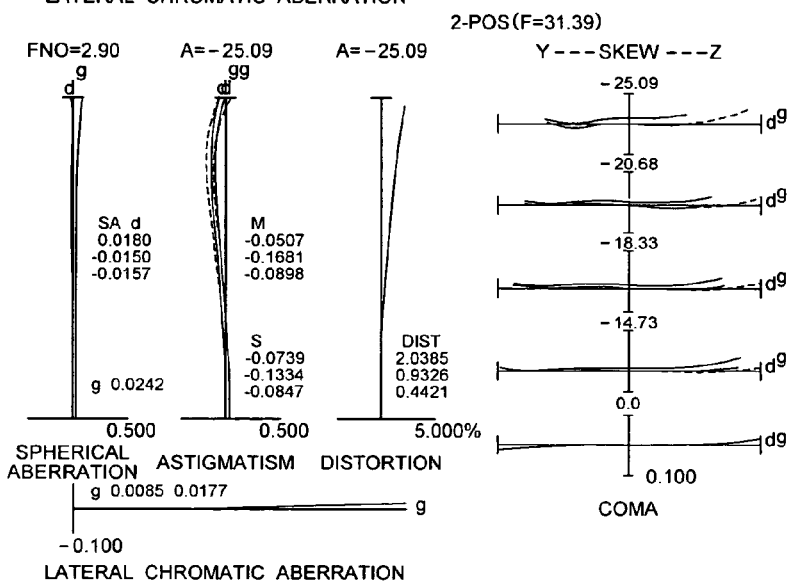
Figure 22C:
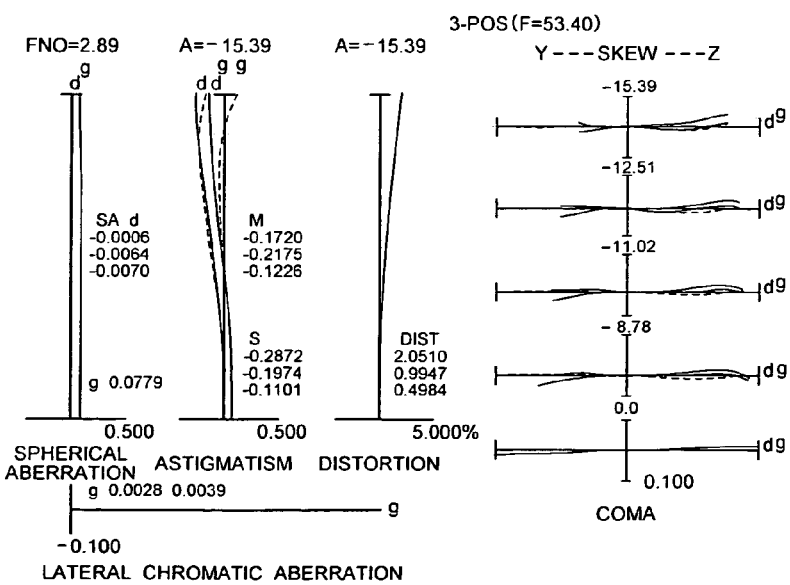

FIGS. 22A, 22B and 22C graphically show various aberrations of the zoom lens system according to Example 11 in a wide-angle end state, an intermediate focal length state, and a telephoto end state, respectively, when the system focusing at infinity.

As is apparent from the respective graphs, the zoom lens system according to Example 11 shows superb optical performance as a result of good corrections to various aberrations in each focal length state (the wide-angle end state, the intermediate focal length state, and the telephoto end state).

Here, values for each conditional expression according to each Example is shown in Table 12. In Table 12, SL1 denotes the special glass constructing a negative lens SL1 in the first lens group G1 according to respective Examples. SL2 and SL3 denote special glasses constructing positive lenses in the fourth lens group G4 according to respective Examples.

TABLE 12

[Values for Conditional Expressions]

| Conditional Expression | EX. 1 | EX. 2 | EX. 3 | EX. 4 | EX. 5 | EX. 6 | EX. 7 | EX. 8 | EX. 9 | EX. 10 | EX. 11 |
|---|---|---|---|---|---|---|---|---|---|---|---|
| (3)SL1 | 0.077 | 0.063 | 0.063 | 0.063 | 0.009 | 0.028 | 0.028 | 0.063 | 0.063 | 0.028 | 0.063 |
| (3)SL2 | 0.063 | 0.028 | 0.028 | 0.028 | 0.028 | 0.063 | 0.028 | 0.009 | 0.028 | 0.028 | 0.028 |
| (3)SL3 | 0.028 | 0.028 | 0.028 | 0.028 | 0.028 | 0.063 |  | 0.009 | 0.028 | 0.028 | 0.028 |
| (4) | 1.86 | 1.76 | 1.69 | 1.75 | 1.79 | 1.90 | 1.92 | 1.93 | 1.93 | 1.80 | 1.771(wide) 1.818(tele) |
| (5) | 1.24 | 1.10 | 1.18 | 1.16 | 1.15 | 1.20 | 1.21 | 1.28 | 1.28 | 1.15 | 1.145 |
| (6) | 0.94 | 0.92 | 0.69 | 0.70 | 0.93 | 0.81 | 0.81 | 0.88 | 0.88 | 0.94 | 0.94 |
| (7) | 1.27 | 1.22 | 1.05 | 1.06 | 1.20 | 1.09 | 1.08 | 1.92 | 1.17 | 1.20 | 1.20 |

As described above, the present invention makes it possible to realize a zoom lens system having an angle of view of 75 degrees or more in a wide-angle end state, and a zoom ratio of 3 or more, capable of obtaining superb optical performance.

The present invention makes it possible to provide a super-wide zoom lens system having sufficient zoom ratio with a high speed capable of obtaining high optical performance.

Additional advantages and modification will readily occur to those skilled in the art. Therefore, the invention in its broader aspects is not limited to the specific details, and representative examples shown and described herein. Accordingly, various modifications may be made without departing from the spirit or scope of the general inventive concept as defined by the appended claims and their equivalents.

What is claimed is:

1. A zoom lens system comprising at least, in order from an object:
   a first lens group having negative refractive power;
   a second lens group having positive refractive power;
   a third lens group; and
   a fourth lens group,
   when the state of lens group positions varies from a wide-angle end state to a telephoto end state;
   each lens group being moved such that;
   a distance between the first lens group and the second lens group varies;
   the first lens group comprising at least one negative lens element;
   wherein a glass material constructing at least one of the negative lens element among the at least one negative lens element in the first lens group satisfies all of the following three conditional expressions:

$67.0 < \nu$ $1.40 < N$ $0 < N + 0.0032 \times \nu - 1.734$ where ν denotes Abbe number of the glass material at d-line (λ=587.6 nm), and N denotes refractive index of the glass material at d-line (λ=587.6 nm).

2. The zoom lens system according to claim 1, further comprising, in order from the object:
   the third lens group having negative refractive power locating to the image side of the second lens group; and
   the fourth lens group having positive refractive power,
   when the state of lens group positions varies from a wide-angle end state to a telephoto end state;
   each lens group being moved such that;
   the distance between the first lens group and the second lens group decreases;
   a distance between the second lens group and the third lens group increases; and
   a distance between the third lens group and the fourth lens group decreases;
   wherein the fourth lens group includes at least one positive lens element; and
   a glass material constructing at least one positive lens element among the at least one positive lens element in the fourth lens group satisfies all of the following three conditional expressions:

$67.0 < \nu$ $1.40 < N$ $0 < N + 0.0032 \times \nu - 1.734$ where ν denotes Abbe number of the glass material at d-line (λ=587.6 nm), and N denotes refractive index of the glass material at d-line (λ=587.6 nm).

3. The zoom lens system according to claim 2, wherein the following conditional expression is satisfied:

$$1.5 < (-f1)/fw < 2.3$$

where f1 denotes the focal length of the first lens group in a wide-angle end state, and fw denotes the focal length of the zoom lens system in a wide-angle end state.

4. The zoom lens system according to claim 3, wherein the following conditional expression is satisfied:

$$0.75 < f2/(fw \times ft)^{1/2} < 1.6$$

where f2 denotes the focal length of the second lens group, fw denotes the focal length of the zoom lens system in a wide-angle end state, and ft denotes the focal length of the zoom lens system in a telephoto end state.

5. The zoom lens system according to claim 4, wherein the following conditional expressions are satisfied:

$$0.6 < (-f3)/f2 < 1.2$$

$$0.8 < f4/(fw \times ft)^{1/2} < 2.0$$

where f3 denotes the focal length of the third lens group, and f4 denotes the focal length of the fourth lens group.

6. The zoom lens system according to claim 2, wherein the following conditional expression is satisfied:

$$0.75 < f2/(fw \times ft)^{1/2} < 1.6$$

where f2 denotes the focal length of the second lens group, fw denotes the focal length of the zoom lens system in a wide-angle end state, and ft denotes the focal length of the zoom lens system in a telephoto end state.

7. The zoom lens system according to claim 2, wherein the following conditional expressions are satisfied:

$$0.6 < (-f3)/f2 < 1.2$$

$$0.8 < f4/(fw \times ft)^{1/2} < 2.0$$

where f2 denotes the focal length of the second lens group, f3 denotes the focal length of the third lens group, f4 denotes the focal length of the fourth lens group, fw denotes the focal length of the zoom lens system in a wide-angle end state, and ft denotes the focal length of the zoom lens system in a telephoto end state.

8. The zoom lens system according to claim 2, wherein at least one lens element having negative refractive power with a concave surface facing to an image in the first lens group has an aspherical surface having negative refractive power getting weaker in accordance with increase in a distance to the surface from the optical axis.

9. The zoom lens system according to claim 2, wherein the negative lens element in the first lens group satisfying all of the three conditional expressions has a double concave shape.

10. The zoom lens system according to claim 2, wherein the first lens group includes the negative lens element that is constructed by a glass material satisfying all of the three conditional expressions and one other lens element, and the negative lens element is cemented with the other lens element.

11. The zoom lens system according to claim 2, wherein when the state of lens group positions varies from a wide-angle end state to a telephoto end state, each distance along the optical axis between each lens element composing the first lens group is fixed.

12. The zoom lens system according to claim 2, wherein the first lens group is composed of, in order from the object, a first sub-lens group having negative refractive power and a second sub-lens group having negative refractive power; and when the state of lens group positions varies from a wide-angle end state to a telephoto end state, the distance between the first sub-lens group and the second sub-lens group varies.

13. The zoom lens system according to claim 1, wherein the following conditional expression is satisfied:

$$1.5 < (-f1)/fw < 2.3$$

where f1 denotes the focal length of the first lens group in a wide-angle end state, and fw denotes the focal length of the zoom lens system in a wide-angle end state.

14. The zoom lens system according to claim 13, wherein the following conditional expression is satisfied:

$$0.75 < f2/(fw \times ft)^{1/2} < 1.6$$

where f2 denotes the focal length of the second lens group, fw denotes the focal length of the zoom lens system in a wide-angle end state, and ft denotes the focal length of the zoom lens system in a telephoto end state.

15. The zoom lens system according to claim 13, wherein the following conditional expressions are satisfied:

$$0.6 < (-f3)/f2 < 1.2$$

$$0.8 < f4/(fw \times ft)^{1/2} < 2.0$$

where f2 denotes the focal length of the second lens group, f3 denotes the focal length of the third lens group, f4 denotes the focal length of the fourth lens group, and ft denotes the focal length of the zoom lens system in a telephoto end state.

16. The zoom lens system according to claim 1, wherein the following conditional expression is satisfied:

$$0.75 < f2/(fw \times ft)1/2 < 1.6$$

where f2 denotes the focal length of the second lens group, fw denotes the focal length of the zoom lens system in a wide-angle end state, and ft denotes the focal length of the zoom lens system in a telephoto end state.

17. The zoom lens system according to claim 16, wherein the following conditional expressions are satisfied:

$$0.6 < (-f3)/f2 < 1.2$$

$$0.8 < f4/(fw \times ft)^{1/2} < 2.0$$

where f3 denotes the focal length of the third lens group, and f4 denotes the focal length of the fourth lens group.

18. The zoom lens system according to claim 1, wherein at least one lens element having negative refractive power with a concave surface facing to an image in the first lens group has an aspherical surface having negative refractive power getting weaker in accordance with increase in a distance to the surface from the optical axis.

19. The zoom lens system according to claim 1, wherein the negative lens element in the first lens group satisfying all of the three conditional expressions has a double concave shape.

20. The zoom lens system according to claim 1, wherein the first lens group includes the negative lens element that is constructed by a glass material satisfying all of the three conditional expressions and one other lens element, and the negative lens element is cemented with the other lens element.

21. The zoom lens system according to claim 1, wherein when the state of lens group positions varies from a wide-angle end state to a telephoto end state, each distance along the optical axis between each lens element composing the first lens group is fixed.

22. The zoom lens system according to claim 1, wherein the first lens group is composed of, in order from the object, a first sub-lens group having negative refractive power and a second sub-lens group having negative refractive power; and when the state of lens group positions varies from a wide-angle end state to a telephoto end state, the distance between the first sub-lens group and the second sub-lens group varies.

23. A method for forming an image of an object and varying a total focal length by a lens system that comprises a first lens group having negative refractive power, a second lens group having positive refractive power, a third lens group and a fourth lens group, in order from the object, comprising the steps of:

providing the first lens group that is composed of at least one negative lens element constructed by a glass material to satisfy the following conditional expressions:

$67.0 < v$ $1.40 < N$ $0 < N + 0.0032 \times v - 1.734$ where v denotes Abbe number of the glass material at d-line ($\lambda=587.6$ nm), and N denotes refractive index of the glass material at d-line ($\lambda=587.6$ nm); and varying the total focal length by moving the first lens group, the second lens group, the third lens group and the fourth lens group and by varying a distance between the first lens group and the second lens group when the lens system moves from a wide-angle end state to a telephoto end state.

24. The method for forming an image of an object and varying a total focal length by a lens system according to claim 23, further comprising the steps of:

providing the fourth lens group that is composed of at least one positive lens element constructed by a glass material to satisfy the following conditional expressions:

$67.0 < v$ $1.40 < N$ $0 < N + 0.0032 \times v - 1.734$ where v denotes Abbe number of the glass material at d-line ($\lambda=587.6$ nm), and N denotes refractive index of the glass material at d-line ($\lambda=587.6$ nm).

25. The method for forming an image of an object and varying a total focal length by a lens system according to claim 23, wherein the negative lens element in the first lens group constructed by a glass material to satisfy all of the three conditional expressions has a double concave shape.

26. The method for forming an image of an object and varying a total focal length by a lens system according to claim 23, wherein the negative lens element in the first lens group constructed by a glass material to satisfy all of the three conditional expressions and one other lens element, and the negative lens element is cemented with the other lens element.

* * * * *

UNITED STATES PATENT AND TRADEMARK OFFICE
CERTIFICATE OF CORRECTION

PATENT NO. : 7,126,759 B2
APPLICATION NO. : 10/892169
DATED : October 24, 2006
INVENTOR(S) : Takayuki Sensui It is certified that error appears in the above-identified patent and that said Letters Patent is hereby corrected as shown below:

<u>On the Title Page</u>:

Item (30), "Foreign Application Priority Data", the second priority document number, "2004-1983449" should read --2004-198349--.

Signed and Sealed this

Thirtieth Day of January, 2007

JON W. DUDAS
*Director of the United States Patent and Trademark Office*